(12) United States Patent
Sugimoto et al.

(10) Patent No.: US 10,175,758 B2
(45) Date of Patent: Jan. 8, 2019

(54) TACTILE SENSE PRESENTATION DEVICE AND METHOD OF DRIVING TACTILE SENSE PRESENTATION DEVICE AND ELECTRODE CONNECTION CONTROL

(71) Applicant: NLT TECHNOLOGIES, LTD., Kawasaki, Kanagawa (JP)

(72) Inventors: Daisuke Sugimoto, Kawasaki (JP); Hiroshi Haga, Kawasaki (JP); Jiro Yanase, Kawasaki (JP)

(73) Assignee: NLT TECHNOLOGIES, LTD., Kawasaki, Kanagawa (JP)

( * ) Notice: Subject to any disclaimer, the term of this patent is extended or adjusted under 35 U.S.C. 154(b) by 281 days.

(21) Appl. No.: 15/165,230

(22) Filed: May 26, 2016

(65) Prior Publication Data

US 2016/0351026 A1 Dec. 1, 2016

(30) Foreign Application Priority Data

Jun. 1, 2015 (JP) ................................ 2015-111564

(51) Int. Cl.
*G06F 3/01* (2006.01)

(52) U.S. Cl.
CPC ........ *G06F 3/016* (2013.01); *G06F 2203/014* (2013.01)

(58) Field of Classification Search
None
See application file for complete search history.

(56) References Cited

U.S. PATENT DOCUMENTS

| | | | | |
|---|---|---|---|---|
| 2011/0187516 A1* | 8/2011 | Makinen | ............... | B60W 50/16 340/425.5 |
| 2013/0164543 A1* | 6/2013 | Shibuya | ................ | G06F 1/1643 428/428 |
| 2014/0071067 A1* | 3/2014 | Hong et al. | ............. | G06F 3/041 345/173 |
| 2014/0071088 A1* | 3/2014 | Hong | .................... | G06F 3/0416 345/174 |
| 2014/0146005 A1* | 5/2014 | Hong | ...................... | G06F 3/016 345/174 |
| 2014/0192005 A1* | 7/2014 | Wakuda | .................. | G06F 3/041 345/173 |

(Continued)

OTHER PUBLICATIONS

Hiroshi Haga, et al., "Electrostatic Tactile Display Using Beat Phenomenon of Voltage Waveforms", SID 2014 Digest, (2014), pp. 623-626.

*Primary Examiner* — David D Davis
(74) *Attorney, Agent, or Firm* — Sughrue Mion, PLLC

(57) ABSTRACT

X and Y electrodes arranged on a support substrate of the tactile sense presentation device are divided into M groups (here, M≥2, M=4 in FIG. 14). When a presentation content of a tactile sense transits from the N-th frame to the (N+1)-th frame, the device, first, sets electrodes belonging to a group 1 to a floating state for a predetermined time and then, connects each electrode to an AC voltage signal source or the ground so as to present a tactile sense in the (N+1)-th frame. The device sequentially performs this operation for each group, and, when the operation of group M ends, transition between frames ends, and movement of the target area in which a texture sense is presented is completed. There is no case where all the electrodes are in the floating state together, and there is no interruption of the texture sense.

13 Claims, 21 Drawing Sheets

(56) References Cited

U.S. PATENT DOCUMENTS

| | | | | |
|---|---|---|---|---|
| 2014/0225844 A1* | 8/2014 | Tada | ................... | G06F 3/016 |
| | | | | 345/173 |
| 2014/0225848 A1* | 8/2014 | Ogura | ................... | G06F 3/041 |
| | | | | 345/173 |
| 2014/0333573 A1* | 11/2014 | Hong | ................... | G06F 3/016 |
| | | | | 345/174 |
| 2015/0103024 A1* | 4/2015 | Haga | ................... | G06F 3/016 |
| | | | | 345/173 |
| 2015/0323995 A1* | 11/2015 | Lim | ................... | G06F 3/0416 |
| | | | | 345/174 |

* cited by examiner

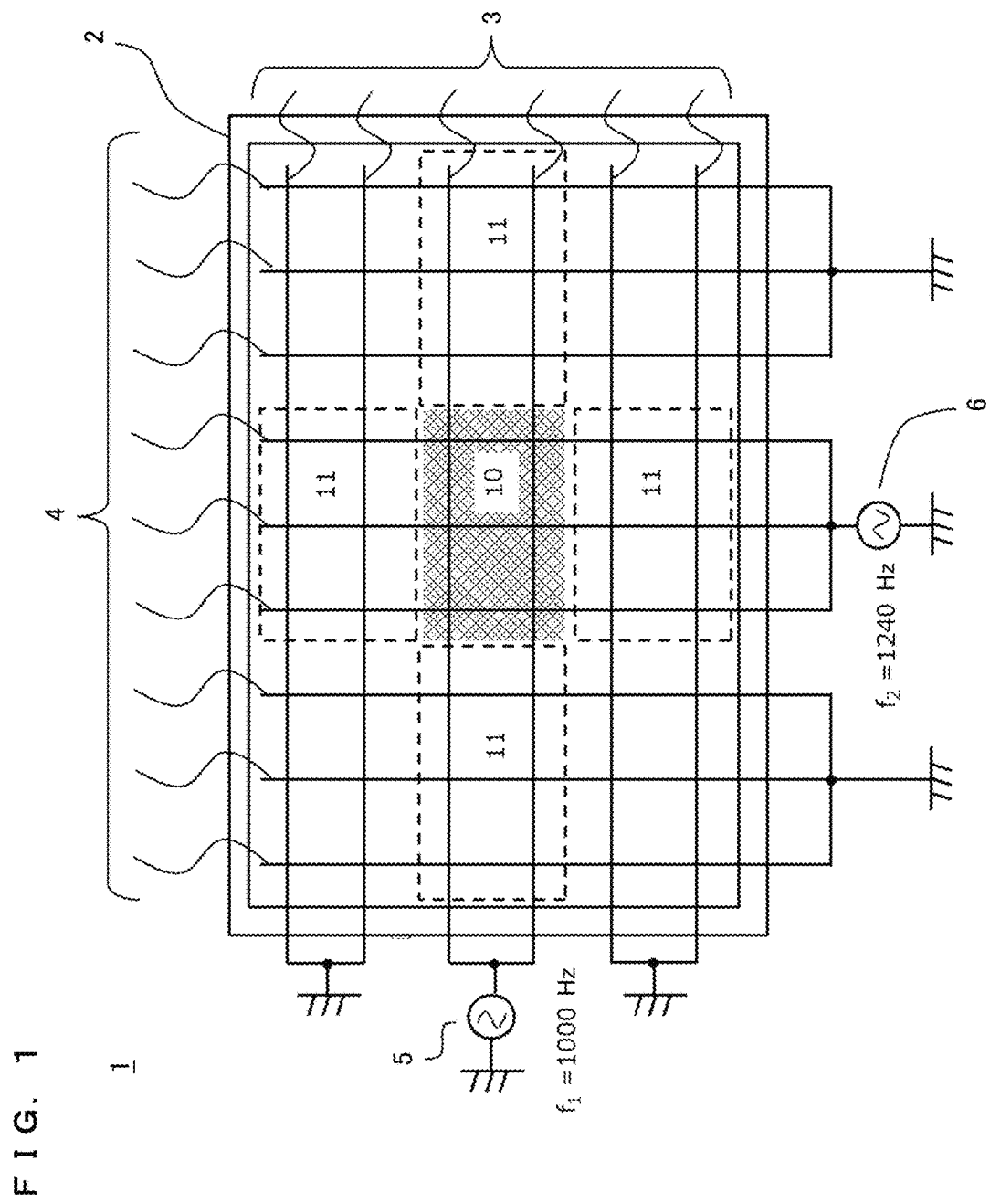

F I G. 4

| GROUP | X ELECTRODE | | | | Y ELECTRODE | | | | |
|---|---|---|---|---|---|---|---|---|---|
| 1 | X0 | X4 | . . . | X28 | Y0 | Y4 | . . . | Y36 | Y40 |
| 2 | X1 | X5 | | X29 | Y1 | Y5 | | Y37 | Y41 |
| 3 | X2 | X6 | | X30 | Y2 | Y6 | | Y38 | - |
| 4 | X3 | X7 | | X31 | Y3 | Y7 | | Y39 | - |

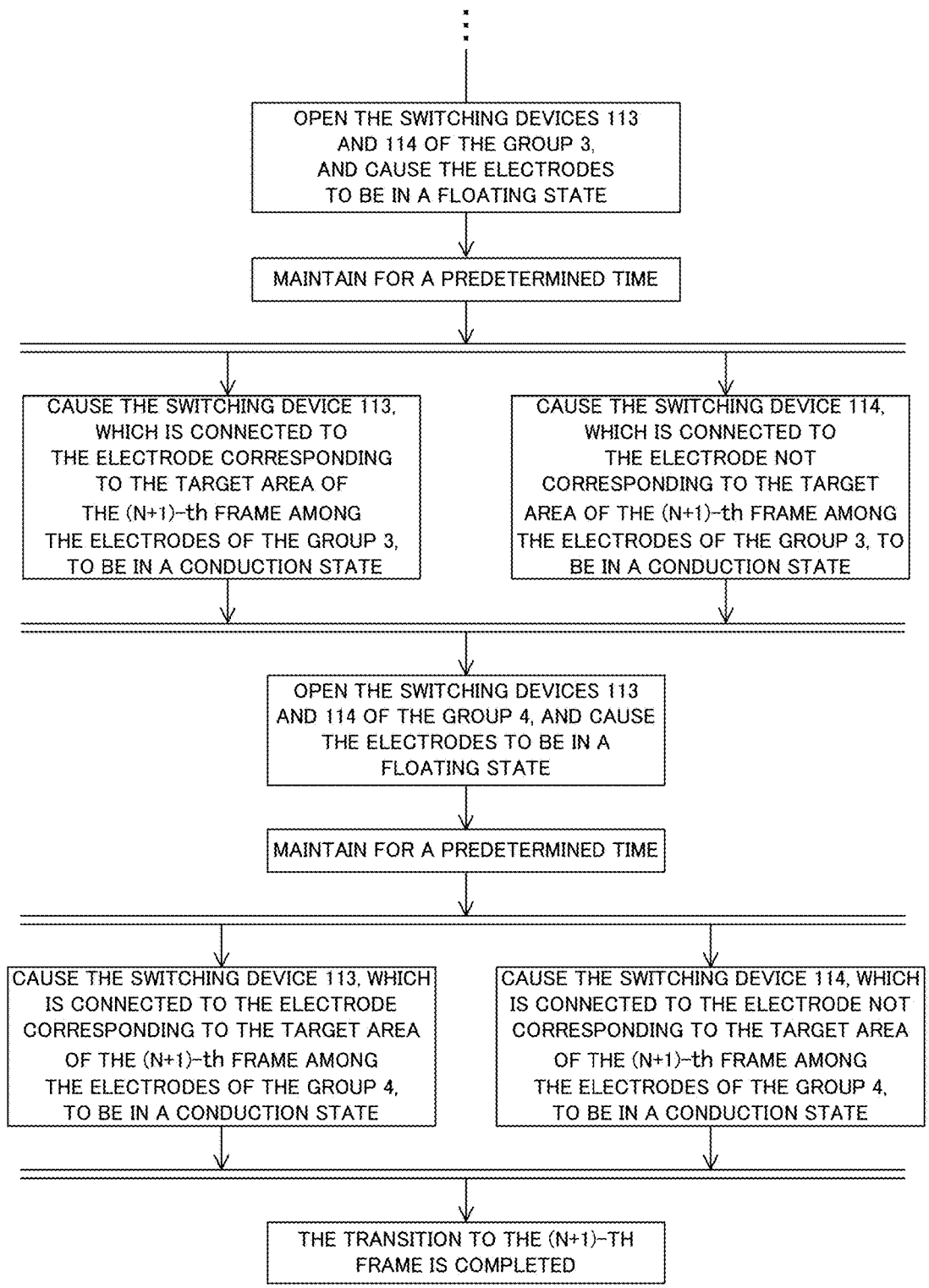

| GROUP | X ELECTRODE | | | Y ELECTRODE | | |
|---|---|---|---|---|---|---|
| 1 | Xa | Xe | Xi | Ya | Ye | Yi |
| 2 | Xb | Xf | Xj | Yb | Yf | Yj |
| 3 | Xc | Xg | Xk | Yc | Yg | Yk |
| 4 | Xd | Xh | Xl | Yd | Yh | Yl |

F I G. 1 6
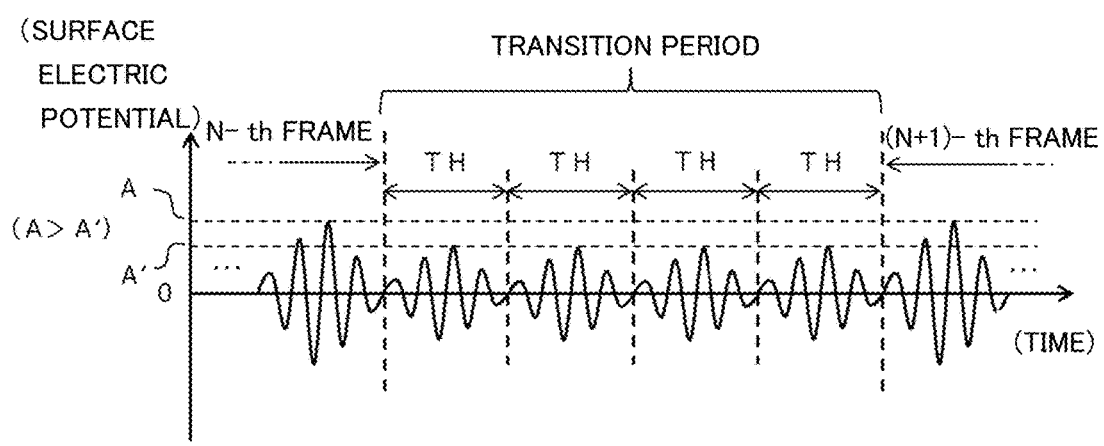

TACTILE SENSE PRESENTATION DEVICE AND METHOD OF DRIVING TACTILE SENSE PRESENTATION DEVICE AND ELECTRODE CONNECTION CONTROL

CROSS-REFERENCE TO RELATED APPLICATIONS

This non-provisional application claims priority under 35 U.S.C. § 119(a) on Patent Application No. 2015-111564 filed in Japan on Jun. 1, 2015, the entire contents of which are hereby incorporated by reference.

BACKGROUND

1. Technical Field

The present invention relates to a tactile sense presentation device presenting a tactile sense to a human body using static electricity and the method of driving a tactile sense presentation device.

2. Description of the Related Art

The background technology of the present invention is a tactile sense presenting technology presenting a tactile sense to a human body through vibrations of an attractive force due to static electricity and being capable of presenting a local tactile sense. In "H. Haga et al., "Electrostatic Tactile Display Using Beat Phenomenon of Voltage Waveforms," SID 2014 Digest, pp. 623-626 (2014)", such a tactile sense presenting technology is disclosed. More specifically, in a tactile sense presentation device, X electrodes are arranged in parallel with the longer side of a support substrate having a rectangular shape, and Y electrodes are arranged in parallel with the shorter side of the support substrate. Then, an AC (Alternate Current) voltage signal of 1000 Hz is applied to the X electrodes from a first AC voltage signal source, and an AC voltage signal of 1240 Hz is applied to the Y electrodes from a second AC voltage signal source. As a result, a texture sense is presented to an area in which the electrodes having AC voltage signals applied thereto intersect with each other. The area in which the texture sense is presented is set as a target area. In the target area, an electric beat vibration of 240 Hz is generated. When a user slides a finger or the like on the surface of the target area, an electrostatic force due to a beat vibration generates a frictional force between the skin and the surface of the target area. A user can perceive the frictional force as a texture sense.

At this time, in an area (hereinafter, referred to as a single signal area) in which an AC voltage signal is applied to only one of the X electrode and the Y electrode, no texture sense is presented. The reason for this is that the frequency of a vibration occurring in the single signal area is beyond the range of frequencies that can be perceived by a person as a texture sense. According to the characteristics described above, a conventional technology presents a texture sense only to the target area, in other words, is capable of giving a local tactile sense presentation.

SUMMARY OF THE INVENTION

The inventors of the present application produced a prototype of a tactile sense presentation device by referring to "H. Haga et al., "Electrostatic Tactile Display Using Beat Phenomenon of Voltage Waveforms," SID 2014 Digest, pp. 623-626 (2014)". FIG. 1 is an explanatory diagram that illustrates the configuration of a tactile sense presentation device 1 that is produced as a prototype by referring to the conventional technology. A plurality of X electrodes 3 are arranged in parallel with the longer side of a support substrate 2 having a rectangular shape, and a plurality of Y electrodes 4 are arranged in parallel with the shorter side of the support substrate 2. An AC voltage signal of 1000 Hz is applied to some of the X electrodes 3 from a first AC voltage signal source 5, and an AC voltage signal of 1240 Hz is applied to some of the Y electrodes 4 from a second AC voltage signal source 6.

In FIG. 1, a target area 10 represented by hatching is an area in which electrodes having AC voltage signals applied thereto intersect with each other. In the target area 10, an electric beat vibration of 240 Hz occurs, and a texture sense is presented. In addition, each single signal area 11 enclosed by dotted lines is an area in which an AC voltage signal is applied to only one of the X electrode 3 and the Y electrode 4 intersecting with each other. In each single signal area 11, a texture sense is not presented.

The tactile sense presentation device 1 can change the position of the target area by changing the electrodes to which the AC voltage signals are applied. In addition, the target area can be continuously moved like in a moving image. Since the support substrate 2, the X electrodes 3 and the Y electrodes 4 are transparent, the tactile sense presentation device 1 can be used with being overlapped with a visual display. In this way, a device presenting a tactile sense corresponding to an image displayed on the visual display can be configured.

FIG. 2 is an explanatory diagram that illustrates the appearance of the movement of an object and a target area displayed on the visual display. Diagrams illustrated on the upper side in FIG. 2 illustrate the appearance of the movement of the object which is included in an image displayed on the visual display and is moving from the N-th frame of the image as a starting point to an (N+1)-th frame and to an (N+2)-th frame. In addition, diagrams illustrated on the lower side illustrate the appearance of the movement of the target area, which presents a texture sense, according to the positions of the object illustrated on the upper side. Here, N is a natural number, and the N-th frame is a frame that is displayed N-th. A target area corresponding to the position of an object 20a included in the N-th frame is a target area 21a. In a case where the tactile sense presentation device is seen on the plan view, AC voltage signals are applied to the X electrodes 3 and the Y electrodes 4 located at positions overlapping the target area, and the other X electrodes 3 and the other Y electrodes 4 are connected to the ground. When the image displayed on the visual display transits from the N-th frame to the next (N+1)-th frame, in accordance with the position of an object 20b included in the (N+1)-th frame, AC voltage signals are applied to the X electrodes 3 and the Y electrodes 4 corresponding to the target area 21b, and the other X electrodes 3 and the other Y electrodes 4 are connected to the ground. Next, also when the image transits from the (N+1)-th frame to the (N+2)-th frame, similarly, in accordance with the position of an object 20c included in the (N+2)-th frame, AC voltage signals are applied to the X electrodes 3 and the Y electrodes 4 corresponding to a target area 21c, and the other X electrodes 3 and the other Y electrodes 4 are connected to the ground. By repeating the operations described above, also in a case where the object displayed on the visual display is continuously moved, the target area can be moved according to the position of the object.

However, the inventors of the present application found following two problems. When a target area is moved by the tactile sense presentation device 1, (1) an unnecessary texture sense in a single signal area is presented and (2) a texture sense in the target area is interrupted. In a case where the target area is stopped, no texture sense is present in the single signal area. However, in a case where the target area is continuously moved like in a moving image, a texture sense is presented also in the single signal area. In other words, a tactile sense that is unnecessary in an area other than the target area is presented, and the characteristic of "the localization of a tactile sense" in the conventional technology is degraded. In addition, since the texture sense of the target area is interrupted when the target area is moved, a user feels a sense of incongruity. In other words, in the target area, an unnecessary tactile sense of the interruption of the texture sense is presented.

According to the present disclosure, there is provided a tactile sense presentation device including: a support substrate; a plurality of X electrodes that are arranged on the support substrate; a plurality of Y electrodes that are arranged on the support substrate and are insulated from the X electrodes; a switching circuit that connects each of the X electrodes and each of the Y electrodes to an AC voltage signal source or a reference voltage source; and a control unit that is used for controlling the switching circuit, wherein the X electrodes and the Y electrodes are divided into at least two groups, and the control unit changes states of the X electrodes and the Y electrodes for one group each time.

According to the present disclosure, there is provided a method of driving a tactile sense presentation device including: a support substrate; a plurality of X electrodes that are arranged on the support substrate; a plurality of Y electrodes that are arranged on the support substrate and are insulated from the X electrodes; a switching circuit that connects each of the X electrodes and each of the Y electrodes to an AC voltage signal source or a reference voltage source selectively; and a control unit that is used for controlling the switching circuit, the method including: dividing the X electrodes and the Y electrodes into at least two groups; and driving the X electrodes and the Y electrodes by changing states of the X electrodes and the Y electrodes for one group each time.

In the present disclosure, the plurality of X electrodes and Y electrodes of the tactile sense presentation device are divided into a plurality of groups. The tactile sense presentation device, when a target area presenting a texture sense is moved, causes electrodes belonging to one group to be in a floating state, and, after maintaining the floating state for a constant time, connects each electrode to one of an AC voltage signal source and the ground so as to be in correspondence with a target area after the movement. The tactile sense presentation device, next, causes electrodes belonging to another one group to be in the floating state. The tactile sense presentation device sequentially performs the operation described above for each group, thereby moving the target area.

By using the method of driving a tactile sense presentation device described above, the number of electrodes that are simultaneously caused to be in the floating state is divided in accordance with a group division number. Accordingly, the area that is simultaneously influenced by the floating state is decreased, and a voltage applied to the electrodes that are in the floating state is not zero in accordance with capacitive coupling. For this reason, an unnecessary tactile sense is not presented, and a texture sense is continuously presented in the target area.

The above and further objects and features of the disclosure will more fully be apparent from the following detailed description with accompanying drawings.

It is to be understood that both the foregoing general description and the following detailed description are exemplary and explanatory and are not restrictive of the disclosure.

BRIEF DESCRIPTION OF THE DRAWINGS

FIG. 1 is an explanatory diagram that illustrates the configuration of a tactile sense presentation device produced as a prototype by referring to a conventional technology;

FIG. 4 is a table that illustrates an example in which all the X electrodes and Y electrodes illustrated in FIG. 3 are divided into four groups;

FIG. 7B is a flowchart that illustrates the operation of the tactile sense presentation device at the time of a transition of the presented content of a tactile sense from the N-th frame to the (N+1)-th frame;

FIG. 16 is an explanatory diagram that illustrates the waveform of surface electric potential of a target area observed in a case where a drive method according to a first embodiment is used;

DETAILED DESCRIPTION

Hereinafter, embodiments of the present invention will be specifically described with reference to drawings.

First Embodiment

Figure 2:
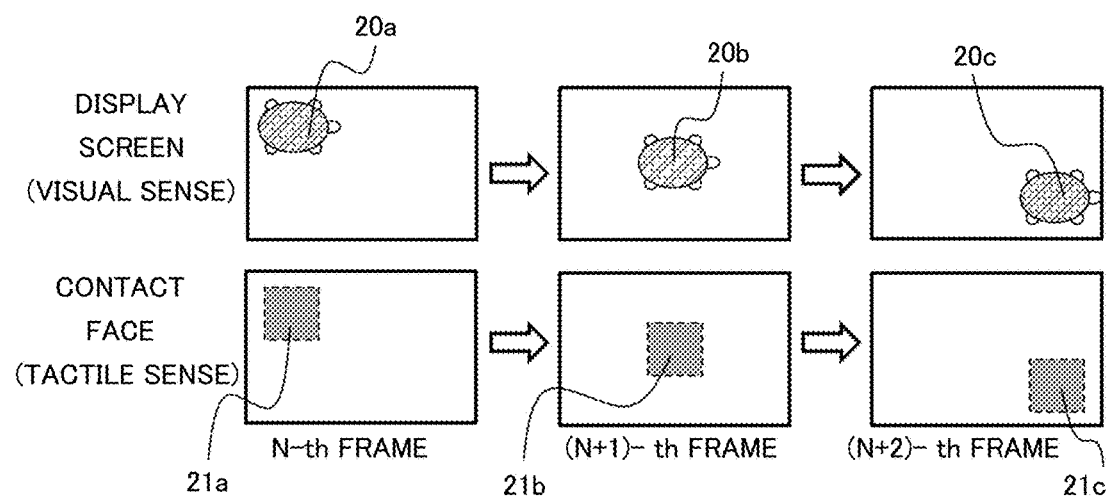
FIG. 2 is an explanatory diagram that illustrates the appearance of the movement of an object and a target area displayed on a visual display.
Figure 3:
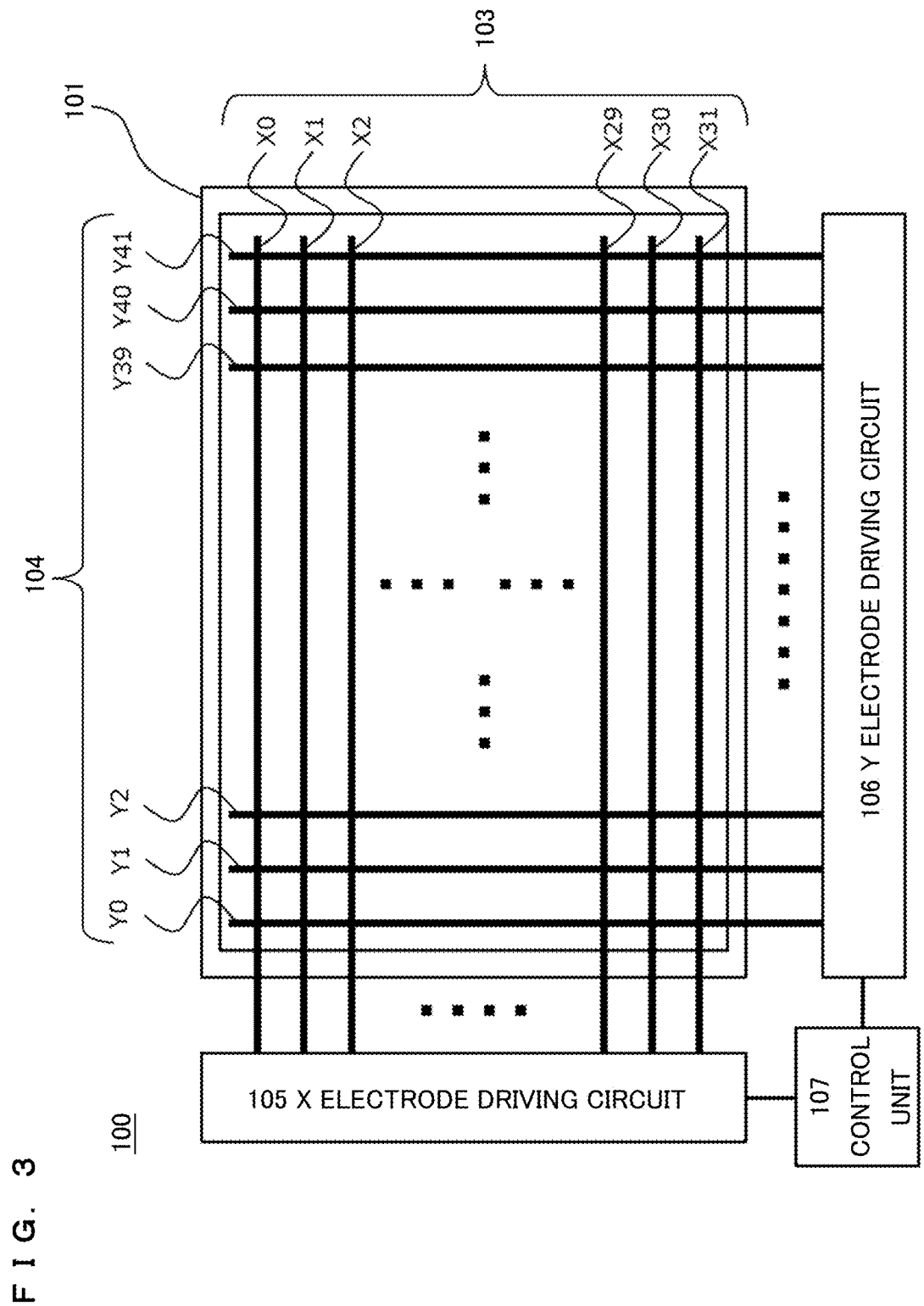
FIG. 3 is an explanatory diagram that illustrates the configuration of a tactile sense presentation device according to a first embodiment.

FIG. 3 is an explanatory diagram that illustrates the configuration of a tactile sense presentation device according to a first embodiment. As illustrated in FIG. 3, a tactile sense presentation device 100 includes a support substrate 101 having a rectangular shape. On the support substrate 101, a plurality of line-shaped X electrodes 103 are arranged in parallel with each other to be in parallel with the longer side of the support substrate 101. In addition, a plurality of line-shaped Y electrodes 104 are arranged in parallel with each other to be in parallel with the shorter side of the support substrate 101. The plurality of Y electrodes 104 are insulated from the plurality of X electrodes 103. The plurality of X electrodes 103 and the plurality of Y electrodes 104 intersect with each other. An X electrode driving circuit 105 is connected to the X electrodes 103, and a Y electrode driving circuit 106 is connected to the Y electrodes 104. A control unit 107 is connected to the X electrode driving circuit 105 and the Y electrode driving circuit 106. The control unit 107 is configured to include a processor and a memory. In the first embodiment, as an example, the number of the X electrodes 103 is 32, and the number of the Y electrodes 104 is 42. In the case illustrated in FIG. 3, X0, X1, . . . , X31 are respectively assigned to the X electrodes 103, and Y0, Y1, . . . , Y41 are respectively assigned to the Y electrodes 104. However, the number of the X electrodes 103 and the number of the Y electrodes 104 may be any other numbers. Here, the pitch of the X electrodes 103 and the pitch of the Y electrodes 104 are set to 5 mm or less. A frame of a tactile sense is presented to the surface of the tactile sense presentation device 100, and a part of the frame is a target area in which a texture sense is presented.

In the tactile sense presentation device 100, all the X electrodes 103 and all the Y electrodes 104 are divided into a plurality of groups. When the number of groups into which the electrodes are divided is defined as M, M has a minimum of 2 and an undetermined upper limit. However, in a case where M is small, an effect of decreasing an unnecessary tactile sense is weakened. On the other hand, as M increases, a transition period of a frame increases, and accordingly, there is concern that smooth movement of a target area is disturbed. In a test using a tactile sense presentation device according to the present embodiment, a sufficient effect has been checked with M=4, and thus, also in the first embodiment, M=4. In this embodiment, the X electrodes 103 and the Y electrodes 104 are divided such that electrodes adjacent to each other belong to mutually-different groups.

FIG. 4 is a table that illustrates an example in which all the X electrodes 103 and all the Y electrodes 104 illustrated in FIG. 3 are divided into four groups. Among the plurality of the X electrodes 103, an X electrode X0 belongs to a group 1, an X electrode X1 belongs to a group 2, an X electrode X2 belongs to a group 3, an X electrode X3 belongs to a group 4, and an X electrode X4 belongs to the group 1. Thereafter, each X electrode 103 belongs to one of the groups 1 to 4 in turn. In addition, among the plurality of the Y electrodes 104, a Y electrode Y0 belongs to a group 1, a Y electrode Y1 belongs to a group 2, a Y electrode Y2 belongs to a group 3, a Y electrode Y3 belongs to a group 4, and a Y electrode Y4 belongs to the group 1. Thereafter, each Y electrode 104 belongs to one of the groups 1 to 4 in turn. In other words, the plurality of the X electrodes 103 and the plurality of the Y electrodes 104 are divided such that electrodes adjacent to each other belong to mutually-different groups. In addition, it is preferable that the plurality of the X electrodes 103 and the plurality of the Y electrodes 104 are divided such that the numbers of electrodes belonging to the groups are equal as possibly as can.

Figure 5:
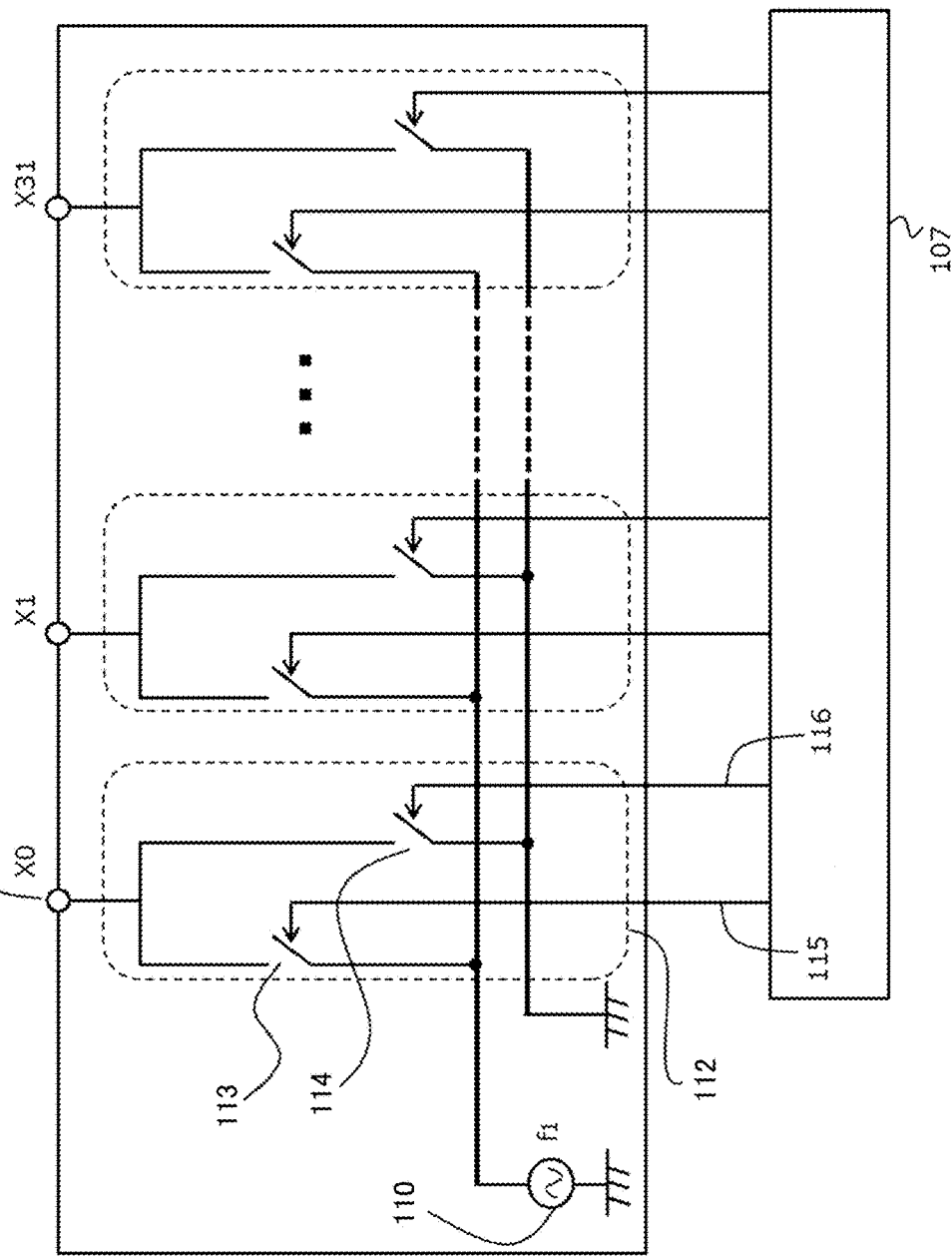
FIG. 5 is an explanatory diagram that illustrates the configuration of an X electrode driving circuit illustrated in FIG. 3.

FIG. 5 is an explanatory diagram that illustrates the configuration of the X electrode driving circuit 105 illustrated in FIG. 3. The X electrode driving circuit 105 includes: a first AC voltage signal source 110; a plurality of output terminals 111 used for connections to the X electrodes 103; and switching circuits 112 connected to the output terminals 111. In the drawing, reference signs (X0, X1, . . . , X31) representing the X electrodes 103 connected to the output terminals 111 are assigned. Each switching circuit 112 includes: a switching device 113 used for connecting the output terminal 111 to the first AC voltage signal source 110; and a switching device 114 used for connecting the output terminal 111 to the ground. Each of the switching devices 113 and 114 is caused to be in one of a conduction state and an open state by receiving a control signal from the control unit 107. The control unit 107 transmits a control signal such that each of the switching devices 113 and 114 is in the open state or the conduction state so as to be in correspondence with information specifying a target area that is input from the outside. In addition, between the control unit 107 and each switching circuit 112, a control signal line 115 used for transmitting a control signal from the control unit 107 to the switching device 113 and a control signal line 116 used for transmitting a control signal from the control unit 107 to the switching device 114 are connected. In a case where the switching device 113 is in the conduction state, the X electrode 103 is connected to the first AC voltage signal source 110 and is applied with an AC voltage signal. On the other hand, in a case where the switching device 114 is in the conduction state, the X electrode 103 is connected to the ground.

Figure 6:
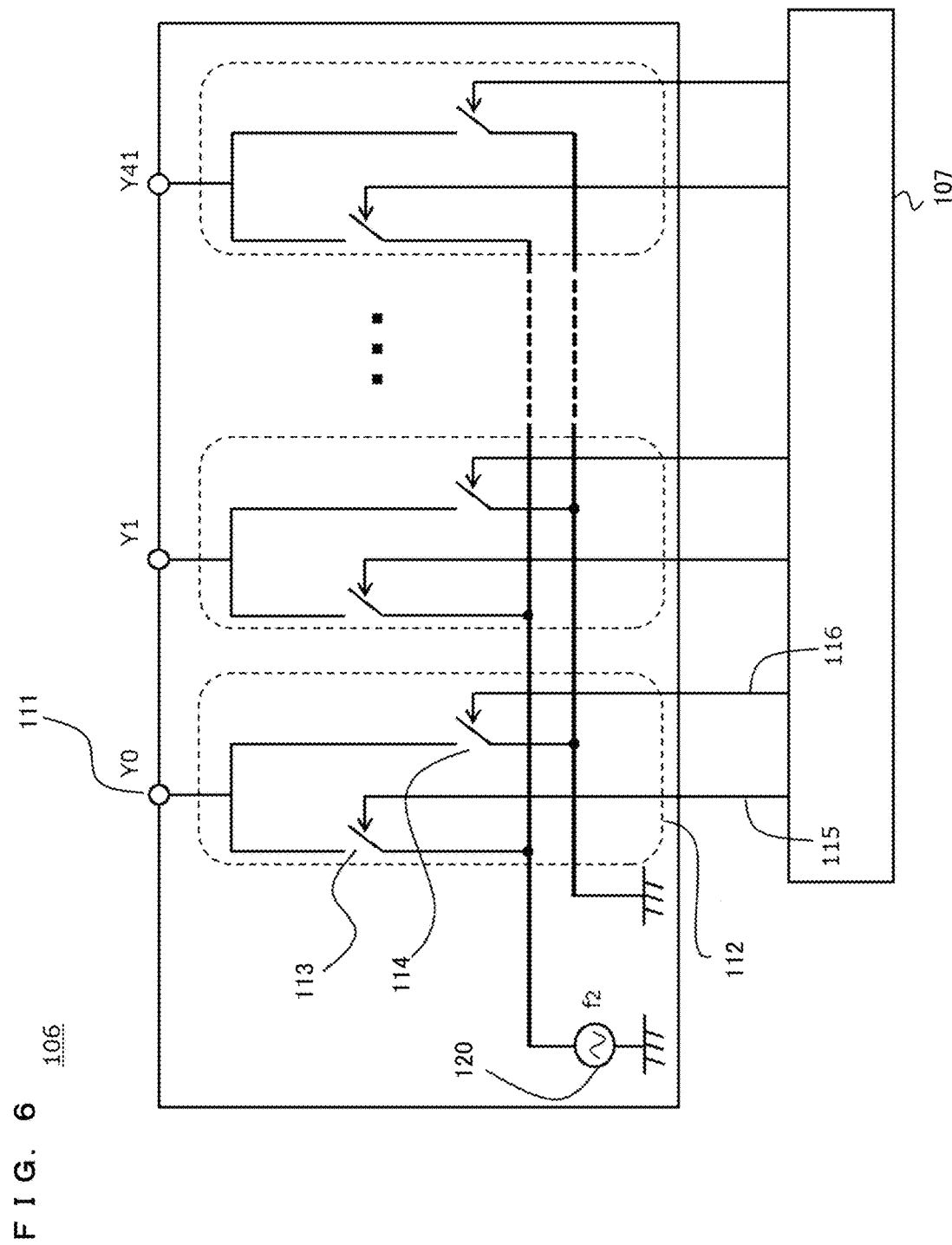
FIG. 6 is an explanatory diagram that illustrates the configuration of a Y electrode driving circuit illustrated in FIG. 3.

FIG. 6 is an explanatory diagram that illustrates the configuration of the Y electrode driving circuit 106 illustrated in FIG. 3. In the Y electrode driving circuit 106, instead of the first AC voltage signal source 110 of the X electrode driving circuit 105, a second AC voltage signal source 120 is included, and the other structure thereof is similar to that of the X electrode driving circuit 105. In a case where the switching device 113 is in the conduction state, the Y electrode 104 is connected to the second AC voltage signal source 120 and is applied with an AC voltage signal. On the other hand, in a case where the switching device 114 is in the conduction state, the Y electrode 104 is connected to the ground. Both the frequency f1 of the first AC voltage signal source 110 and the frequency f2 of the second AC voltage signal source 120 are 500 Hz or more, and a difference between the frequencies is 10 Hz or more and less than 1000 Hz. The frequencies f1 and f2 satisfy a condition that a texture sense is not presented with the presence of an AC voltage signal of any one thereof, and a texture sense is presented in accordance with a beat according to the frequencies f1 and f2.

While an example in which one node of the switching device 114 is connected to the ground has been described, the position to which the node is connected is not limited to the ground. For example, the node may be connected to a DC (Direct Current) voltage source of other than zero volts or a third AC voltage signal source. An AC voltage signal generated by the third AC voltage signal source does not independently present a texture sense, and no texture sense is presented even in the case of generating a beat together with a first AC voltage signal or a second AC voltage signal. The ground that is a DC voltage source of zero voltage, the DC voltage source of other than zero volts, and the third AC voltage signal source are regarded as reference voltage sources. In other words, a configuration in which the node is connected to the reference voltage source belongs to the present embodiment.

Figure 7A:
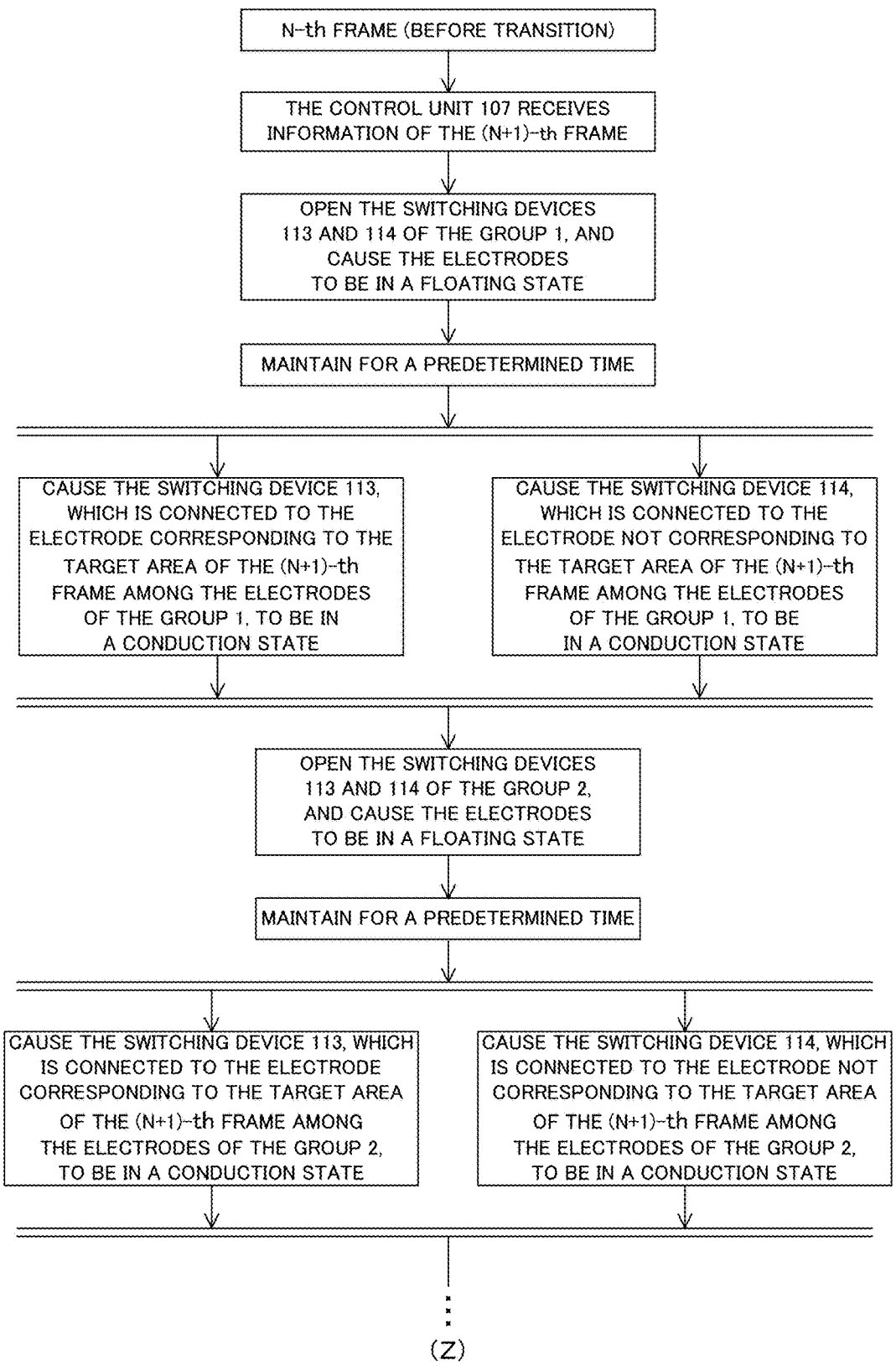
FIG. 7A is a flowchart that illustrates the operation of the tactile sense presentation device at the time of a transition of a presented content of a tactile sense from the N-th frame to the (N+1)-th frame.

Next, the operation of the tactile sense presentation device 100 will be described. FIGS. 7A and 7B represent a flowchart that illustrates the operation of the tactile sense presentation device 100 at the time of a transition of a presented content of a tactile sense from the N-th frame to the (N+1)-th frame. Here, N is a natural number, and the N-th frame is the N-th frame among frames of a tactile sense that are sequentially presented by the tactile sense presentation device 100. The process of the tactile sense presentation device 100 is continued from (Z) illustrated in FIG. 7A to (Z) illustrated in FIG. 7B. In FIGS. 7A and 7B, the flowchart in the case of a group number M of 4 is illustrated.

Hereinafter, the operation of the tactile sense presentation device 100 will be described along the flow of the flowchart illustrated in FIGS. 7A and 7B. In the state of the N-th frame before a transition, the control unit 107 receives information specifying a target area of the (N+1)-th frame. The control unit 107 opens the switching devices 113 and 114 by inputting control signals to the switching circuits 112 connected to the electrodes of the group 1. The switching devices 113 and 114 connected to the electrodes of the group 1 are in the open state, and the electrodes of the group 1 are in a floating state. After the floating state is maintained for a predetermined time, the control unit 107, by inputting a control signal to each switching circuit 112 connected to the electrode corresponding to the target area of the (N+1)-th frame among the electrodes of the group 1, causes the switching device 113 to be in the conduction state. Each switching device 113 connected to the electrodes corresponding to the target area of the (N+1)-th frame among the electrodes of the group 1 is caused to be the conduction state, and an AC voltage signal is applied to the electrodes corresponding to the target area. At the same time, the control unit 107, by inputting a control signal to each switching circuit 112 connected to the electrode not corresponding to the target area of the (N+1)-th frame among the electrodes of the group 1, causes the switching device 114 in the conduction state. Each switching device 114 connected to the electrode not corresponding to the target area of the (N+1)-th frame among the electrodes of the group 1 is caused to be in the conduction state, and accordingly, the electrodes not corresponding to the target area are connected to the ground.

Subsequently, similarly, the switching devices 113 and 114 connected to the electrode of the group 2 are caused to be in the open state, and the electrodes of the group 2 are in the floating state. After the floating state is maintained for a predetermined time, similarly, each switching device 113 connected to the electrode corresponding to the target area of the (N+1)-th frame among the electrodes of the group 2 is caused to be in the conduction state, and an AC voltage signal is applied to the electrode corresponding to the target area. At the same time, each switching device 114 connected to the electrode not corresponding to the target area of the (N+1)-th frame among the electrodes of the group 2 is caused to be in the conduction state, and accordingly, the electrodes not corresponding to the target area are connected to the ground.

The operation described above is repeated for each group, and, in the first embodiment, when the operations up to the group 4 are completed, the transition from the N-th frame to the (N+1)-th frame is completed. In accordance with the transition from the N-th frame to the (N+1)-th frame, the target area is moved. In addition, there is a target area that does not move. Thereafter, until information of the next frame is input to the control unit 107, the state of each electrode of the (N+1)-th frame is maintained.

Next, the time during which the electrodes are maintained in the floating state will be described. In this embodiment, as illustrated in FIGS. 5 and 6, the tactile sense presentation device 100 has a structure in which each electrode is connected to the AC voltage signal source through the output terminal 111 by causing the switching device 113 to be in the conduction state, and each electrode is connected to the ground through the output terminal 111 by causing the switching device 114 to be in the conduction state. In a case where the switching device 113 and 114 are simultaneously in the conduction state, and there is concern that the AC voltage source and the ground form a short circuit, and the circuit is damaged. Thus, it is necessary to operate the tactile sense presentation device 100 so as to avoid the situation in which the switching devices 113 and 114 are simultaneously in the conduction state.

In a switching device, a maximum turn-off time (Maxtoff) is defined in the specifications. The maximum turn-off time is a maximum time required for the switching device to transit to the open state after the switching device receives a control signal used for causing the open state in the conduction state. In this embodiment, the polarity of the control signal of the switching devices 113 and 114 is normally open. When the control signal is at the low level, the switching devices 113 and 114 are open. On the other hand, when the control signal is at the high level, the switching devices 113 and 114 are conductive.

For example, in a case where a certain electrode transits from a state of being connected to the AC voltage signal source to a state of being connected to the ground, the control unit 107, after transmitting a control signal used for causing the open state to the switching device 113, stands by for a time until the switching device 113 is in the completely open state after the fall of the transmitted control signal, in other words, for the maximum turn-off time (Maxtoff) and then transmits a control signal used for causing the conduction state to the switching device 114. By configuring as such, a situation in which the switching device 113 and 114 are simultaneously in the conduction state can be avoided.

Here, a time from a moment at which a signal transmitted through the control signal line 115 to the switching device 113 starts to fall to a moment at which a signal transmitted through the control signal line 116 to the switching device 114 starts to rise is defined as a time T. By setting the time T so as to satisfy the condition of the following Equation (1), the switching circuit 112 illustrated in FIGS. 5 and 6 can be safely driven. At this time, a time during which the electrode maintains the floating state is (T−Maxtoff) seconds.

$$(\text{Max}toff) < T \tag{1}$$

Figure 8:
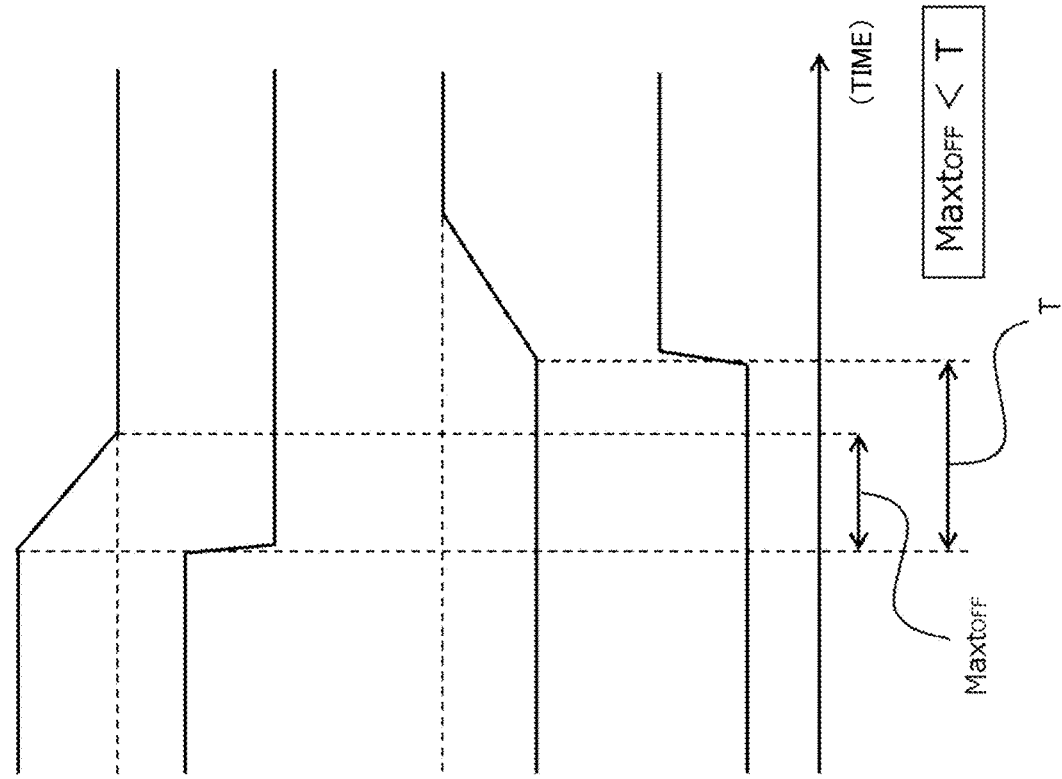
FIG. 8 is a timing diagram that illustrates the states of switching devices and the states of signals transmitted through control signal lines.

FIG. 8 is a timing diagram that illustrates the states of the switching devices 113 and 114 and the states of signals transmitted through the control signal lines 115 and 116. In the drawing, the horizontal axis represents the time, and the vertical axis presents the signal level. In the drawing, relation between the maximum turn-off time Maxtoff and the time T is illustrated. In the initial state, the switching device 113 is in the conduction state, and the switching device 114 is in the open state. The control signal line 115 transmits a falling control signal used for causing the switching device 113 to transit from the conduction state to the open state. According to the falling of the signal transmitted through the control signal line 115, the switching device 113 starts to transit from the conduction state to the open state and is in the completely open state after an elapse of the maximum turn-off time Maxtoff. After an elapse of the time T after the start of falling of the signal transmitted through the control signal line 115, the control signal line 116 transmits a rising control signal used for causing the switching device 114 to transit from the open state to the conduction state. After the rising of the signal transmitted through the control signal line 116, the switching device 114 transits from the open state to the conduction state. Since Maxtoff<T, the switching devices 113 and 114 are not simultaneously conductive.

Figure 9:
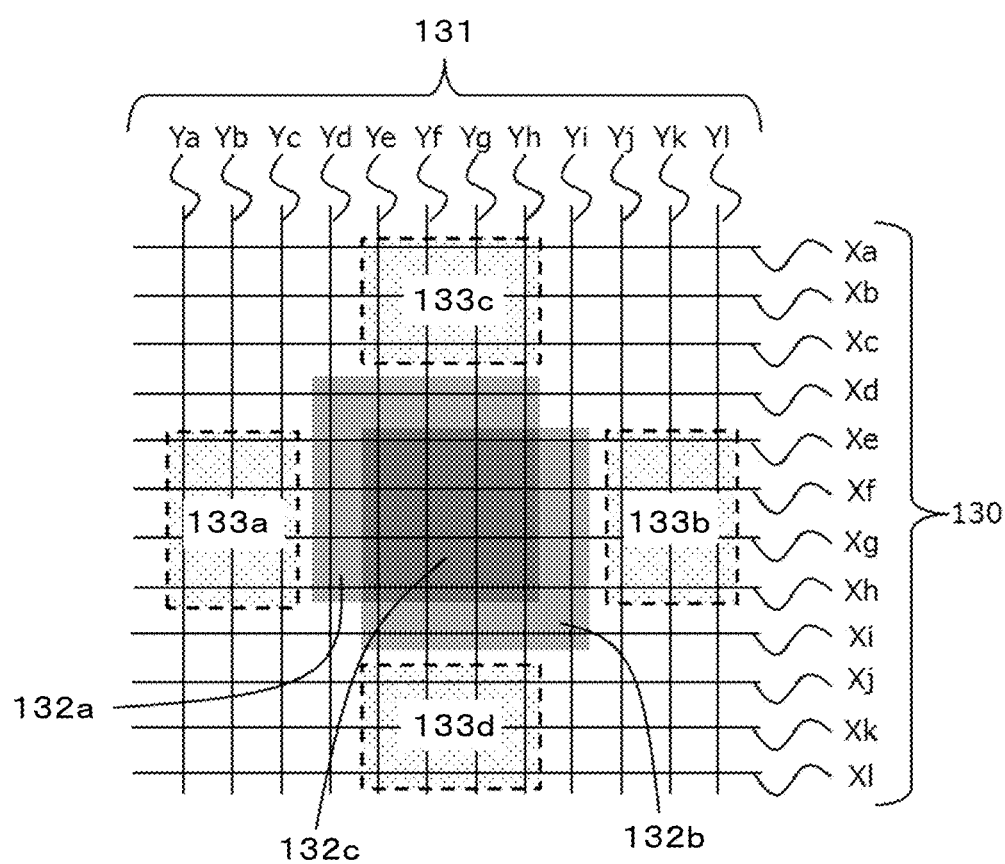
FIG. 9 is an explanatory diagram that illustrates an example of movement of an area in which a texture sense is presented from a target area of the N-th frame to a target area of the (N+1)-th frame on a tactile sense presentation face of the tactile sense presentation device.

Hereinafter, in the tactile sense presentation device 100, a case where a target area is moved will be illustrated as an example, a drive method of a case where an unnecessary tactile sense is presented and a drive method according to this embodiment are compared with each other, and effects acquired in this embodiment will be described. FIG. 9 is an explanatory diagram that illustrates an example of movement of an area in which a texture sense is presented from a target area 132a of the N-th frame to a target area 132b of the (N+1)-th frame on a tactile sense presentation face of the tactile sense presentation device 100. In the example illustrated in FIG. 9, Xa to Xl are assigned to a plurality of X electrodes 130, and Ya to Yl are assigned to a plurality of Y electrodes 131. In areas 133a and 133b enclosed by broken lines illustrated in FIG. 9, a second AC voltage signal is not applied to the Y electrodes 131. In both before a transition from the N-th frame to the (N+1)-th frame and after the transition, the first AC voltage signal is applied to the same X electrodes 130 (Xe to Xh). In areas 133c and 133d enclosed by broken lines illustrated in FIG. 9, the first AC voltage signal is not applied to the X electrodes 130. In both before a transition from the N-th frame to the (N+1)-th frame and after the transition, the second AC voltage signal is applied to the same Y electrodes 131 (Ye to Yh). In other words, the areas 133a, 133b, 133c, and 133d are single signal areas in both the N-th frame and the (N+1)-th frame. In addition, the area 132c illustrated in FIG. 9 is an area in which the target area 132a of the N-th frame and the target area 132b of the (N+1)-th frame overlap each other.

Figures 10, 11:
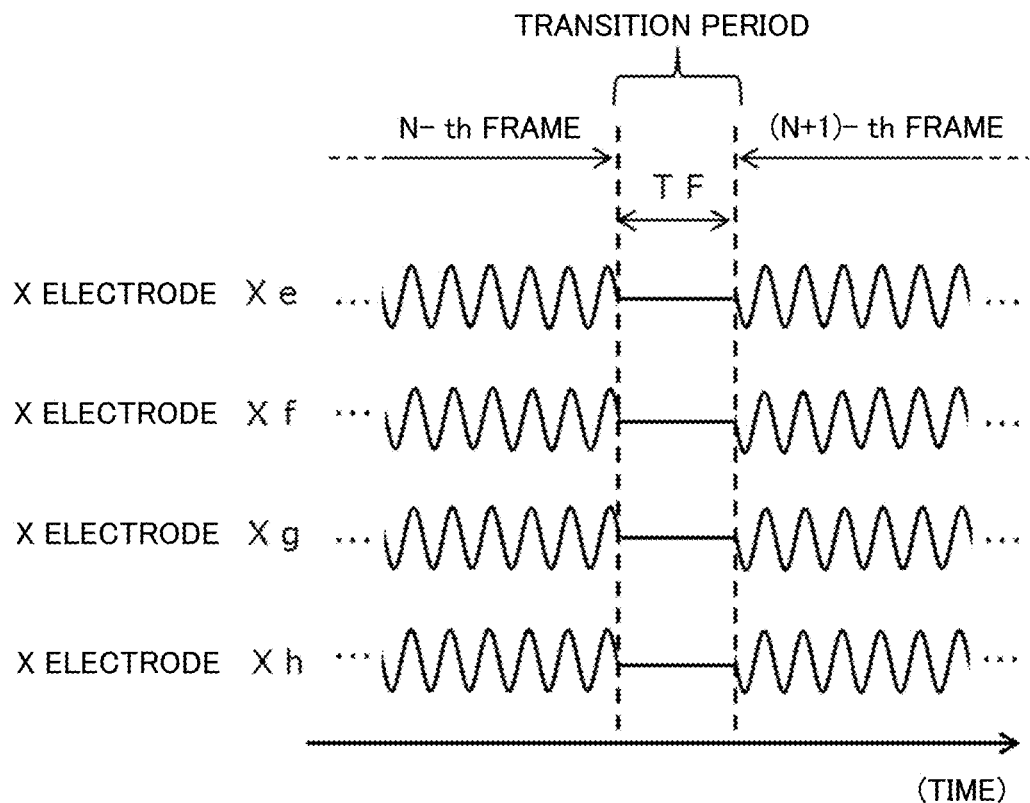
FIG. 10 is a table that illustrates a state in which X electrodes and Y electrodes are divided into four groups in the example illustrated in FIG. 9.
FIG. 11 is an explanatory diagram that illustrates the waveforms of voltage signals applied to X electrodes according to a drive method of a case where an unnecessary tactile sense is presented in transitions of frames illustrated in FIG. 9.

FIG. 10 is a table that illustrates a state in which the X electrodes 130 and the Y electrodes 131 are divided into four groups in the example illustrated in FIG. 9. Among the plurality of the X electrodes 130, X electrodes Xa, Xe, and Xi belong to a group 1, X electrodes Xb, Xf, and Xj belong to a group 2, X electrodes Xc, Xg, and Xk belong to a group 3, and X electrodes Xd, Xh, and Xl belong to a group 4. In addition, among the plurality of the Y electrodes 131, Y electrodes Ya, Ye, and Yi belong to a group 1, Y electrodes Yb, Yf, and Yj belong to a group 2, Y electrodes Yc, Yg, and Yk belong to a group 3, and Y electrodes Yd, Yh, and Yl belong to a group 4.

Figure 12:
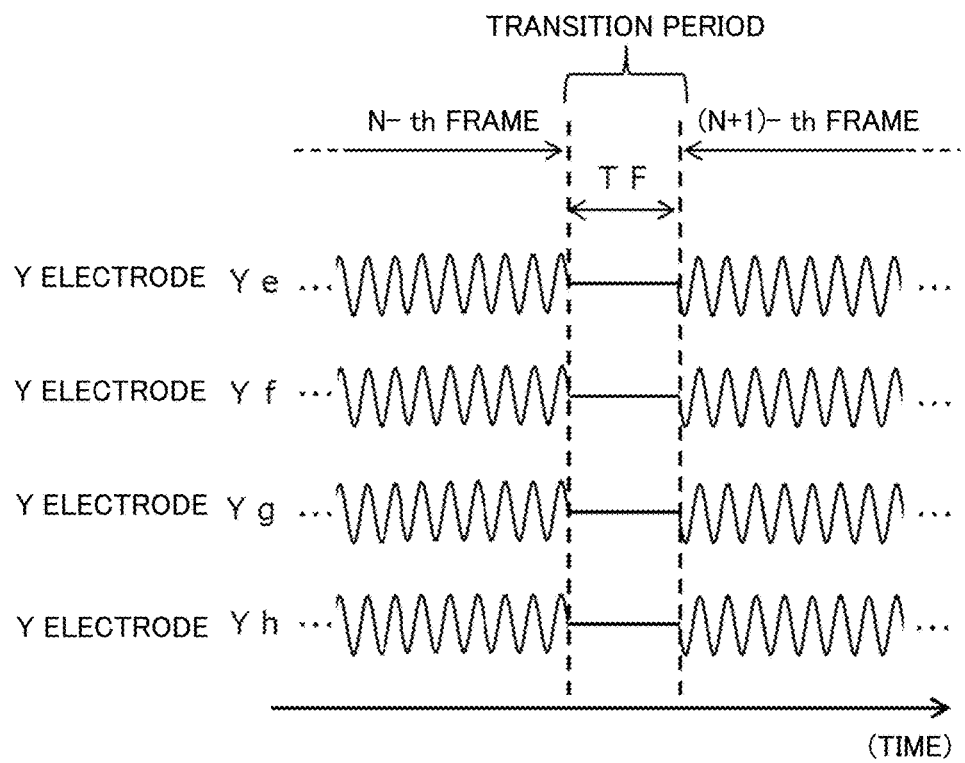
FIG. 12 is an explanatory diagram that illustrates the waveforms of voltage signals applied to Y electrodes according to the drive method of a case where an unnecessary tactile sense is presented in the transitions of frames illustrated in FIG. 9.

First, the operation of the drive method of a case where an unnecessary tactile sense is presented will be described. FIG. 11 is an explanatory diagram that illustrates the waveforms of voltage signals applied to the X electrodes 130 (Xe, Xf, Xg, and Xh) according to the drive method of a case where an unnecessary tactile sense is presented in transitions of frames illustrated in FIG. 9. FIG. 12 is an explanatory diagram that illustrates the waveforms of voltage signals applied to the Y electrodes 131 (Ye, Yf, Yg, Yh) according to the drive method of a case where an unnecessary tactile sense is presented in the transitions of frames illustrated in FIG. 9. In the drawing, the horizontal axis represents the time. The X electrodes 130 (Xe, Xf, Xg, and Xh) are the X electrodes 130 corresponding to the areas 133a and 133b, and the Y electrodes 131 (Ye, Yf, Yg, Yh) are the Y electrodes 131 corresponding to the areas 133c and 133d. In FIGS. 11 and 12, the waveforms of voltage signals applied to the X electrodes 130 and the Y electrodes 131 during a period in which a presented content of a tactile sense transits from the N-th frame to the (N+1)-th frame are illustrated.

As illustrated in FIGS. 11 and 12, in a state in which the N-th frame is presented, AC voltage signals are applied to the electrodes. In the drive method of a case where an unnecessary tactile sense is presented, when a transition between frames is made, all the electrodes are caused to be in the floating state together. For this reason, when a time during which the electrodes are maintained to be in the floating state is TF, the transition period of the frame is equal to the time TF. Since all the electrodes are caused to be in the floating state together in this transition period, as illustrated in FIGS. 11 and 12, voltages measured at the electrodes are zero. The inventors of the present application have checked that unnecessary texture senses are presented in the areas 133a, 133b, 133c, and 133d illustrated in FIG. 9 at a moment when the voltages become zero from a state in which AC voltage signals are applied to the electrodes. In other words, an unnecessary tactile sense in an area other than the target area is generated when switching from a state in which the AC voltage signal is applied to a state in which the AC voltage signal is not applied is made.

In a case where the target area does not move, and the floating state of the electrodes does not occur, a texture sense is not generated in a single signal area. In such a case, an AC voltage signal is continuously applied to the single signal area, and the spectrum of the frequencies of vibrations is concentrated on a frequency (for example, 2000 Hz) that is twice the frequency of the AC voltage signal. Since the frequency of 2000 Hz or the like is not sensed by a human body, a texture sense is not generated. On the other hand, in a case where the target area is moved, all the electrodes are in the floating state all together at the time of the movement, and an interruption of the AC voltage signal occurs in the single signal area. Accordingly, the spectrum of the frequencies of vibrations occurring in the single signal area is widely distributed having the frequency that is twice the frequency of the AC voltage signal as its center and is distributed also within the range of 10 to 1000 Hz which is sensible to the human body. For this reason, it is assumed that a texture sense is presented in the single signal area.

Figure 13:
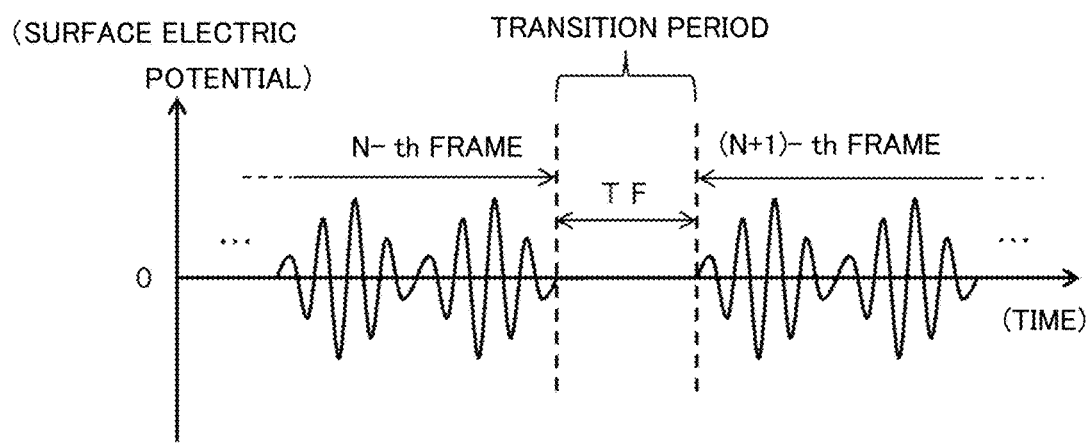
FIG. 13 is an explanatory diagram that illustrates the waveform of surface electric potential observed when a drive method of a case where an unnecessary tactile sense is presented is used in an area in which a target area of the N-th frame and a target area of the (N+1)-th frame overlap each other.

FIG. 13 is an explanatory diagram that illustrates the waveform of surface electric potential observed when the drive method of a case where an unnecessary tactile sense is presented is used in the area 132c in which the target area 132a of the N-th frame and the target area 132b of the (N+1)-th frame overlap each other. In the drawing, the horizontal axis represents the time, and the vertical axis represents the surface electric potential. In FIG. 13, surface electric potential observed when a presented content of a tactile sense transits from the N-th frame to the (N+1)-th frame is illustrated. In the N-th frame and the (N+1)-th frame, an electric beat due to the first AC voltage signal and the second AC voltage signal is observed. However, during the period of the transition from the N-th frame to the (N+1)-th frame, the surface electric potential is zero. The inventors of this application has checked that, in the area 132c illustrated in FIG. 9, while a texture sense can be perceived in the N-th frame and the (N+1)-th frame, but a texture sense is interrupted for one moment during the transition period. During the transition period, no electric beat is present, and thus, the interruption of the texture sense is considered to occur. In other words, an unnecessary tactile sense in the target area is generated during the period of a transition between frames.

Figure 14:
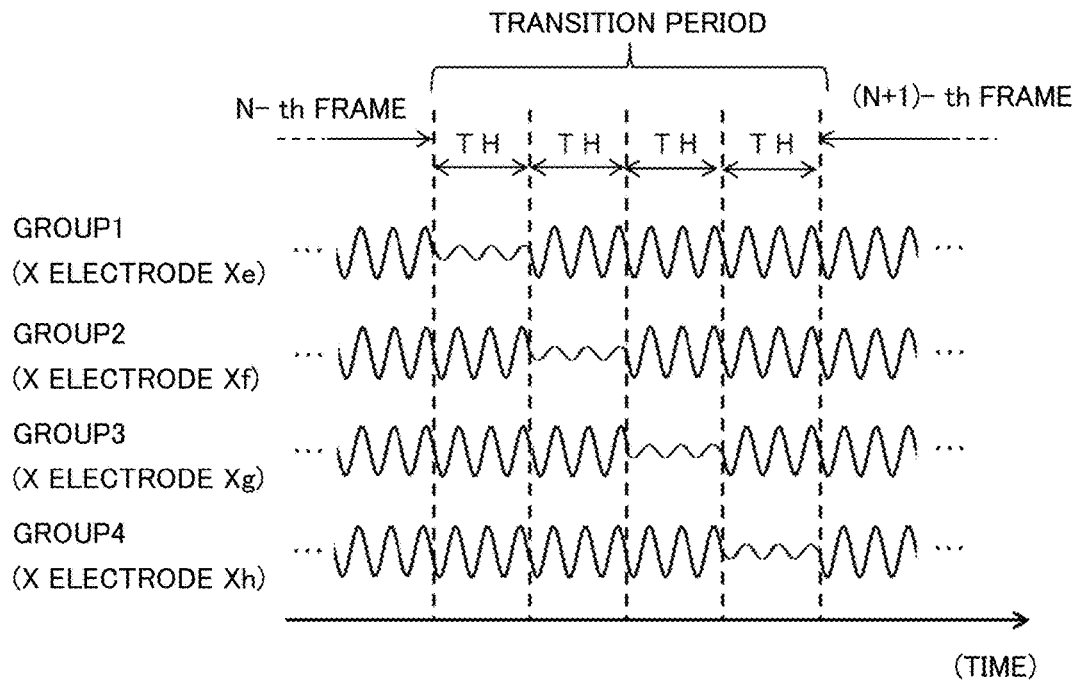
FIG. 14 is an explanatory diagram that illustrates the waveforms of voltage signals applied to X electrodes according to a drive method of this embodiment in transitions of frames illustrated in FIG. 9.
Figure 15:
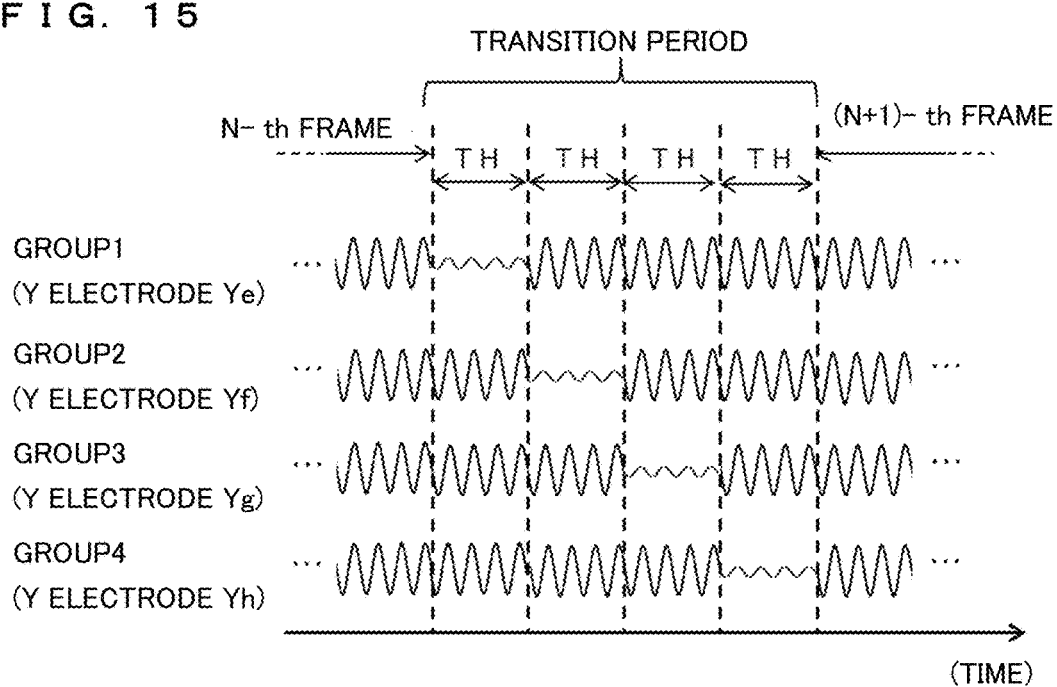
FIG. 15 is an explanatory diagram that illustrates the waveforms of voltage signals applied to Y electrodes according to the drive method of this embodiment in the transitions of frames illustrated in FIG. 9.

Next, the effects of a case where a drive method according to this embodiment is used will be described. FIG. 14 is an explanatory diagram that illustrates the waveforms of voltage signals applied to the X electrodes 130 (Xe, Xf, Xg, and Xh) according to the drive method of this embodiment in the transitions of frames illustrated in FIG. 9. FIG. 15 is an explanatory diagram that illustrates the waveforms of voltage signals applied to the Y electrodes 131 (Ye, Yf, Yg, and Yh) according to the drive method of this embodiment in the transitions of frames illustrated in FIG. 9. In the drawings, the horizontal axis represents the time. In FIGS. 14 and 15, the waveforms of the voltage signals applied to the X electrodes 130 and the Y electrodes 131 in accordance with the drive method of this embodiment during a period in which a presented content of a tactile sense transits from the N-th frame to the (N+1)-th frame are illustrated.

In a state in which the N-th frame is presented, an AC voltage signal is applied to each electrode. As illustrated in FIG. 14, when a transition between frames is made, first, an X electrode 130 (for example, the X electrode Xe) belonging to the group 1 is in the floating state, and an AC voltage signal is applied to the X electrodes 130 belonging to the other groups. Next, an X electrode 130 (for example, the X electrode Xf) belonging to the group 2 is in the floating state, and an AC voltage signal is applied to the X electrodes 130 belonging to the other groups. Similarly, an X electrode 130 (for example, an X electrode Xg) belonging to the group 3 and an X electrode 130 (for example, an X electrode Xh) belonging to the group 4 are sequentially in the floating state, and, in the interval, an AC voltage signal is applied to X electrodes 130 belonging to the other groups. In other words, the X electrodes 130 are sequentially caused to be in the floating state at different timing for each group. Similarly, as illustrated in FIG. 15, a Y electrode 131 (for example, the Y electrode Ye) belonging to the group 1, a Y electrode 131 (for example, the Y electrode Yf) belonging to the group 2, a Y electrode 131 (for example, the Y electrode Yg) belonging to the group 3, and a Y electrode 131 (for example, the Y electrode Yh) belonging to the group 4 are sequentially caused to be in the floating state, and, in each interval, an AC voltage signal is applied to Y electrodes 131 belonging to the other groups. In other words, the Y electrodes 131 are sequentially caused to be in the floating state at different timing for each group.

Here, a time during which the electrode is maintained to be in the floating state is denoted by TH. For example, TH=5 ms. The value of TH is different depending on the specifications of the switching device. According to the drive method of this embodiment, the floating state is formed for each group, and accordingly, the transition period of frames is equal to four times the time TH. During the transition period, also in a state in which the electrodes of one group is in the floating state, an AC voltage signal is constantly applied to the electrodes of the other three groups. In other words, the area that is simultaneously influenced by the floating is ¼ of that according to the drive method of a case where an unnecessary tactile sense is presented. In addition, the inventors of the present application have checked that an electrode that is in the floating state is capacitive-coupled with neighboring electrodes of the other groups, to which an AC voltage signal is applied, and the voltage thereof is not zero.

Since the area influenced by the floating becomes ¼, an area in which vibrations having frequencies of 10 to 1000 Hz sensed by the human body in accordance with an occurrence of the interruption of the AC voltage signal occur is decreased. In addition, since the voltage applied to the electrode that is in the floating state is not zero, the intensity of vibrations having frequencies of 10 to 1000 Hz decrease. According to these two effects, a texture sense presented in the areas 133a, 133b, 133c, and 133d is assumed to decrease to a level that cannot be perceived by a human body. Actually, the inventors of the present application have checked that a texture sense is not perceived in the areas 133a, 133b, 133c, and 133d. In this embodiment, simultaneous applications of an AC voltage signal over a plurality of electrodes neighboring to each other included in an area range in which a tactile sense can be perceived by a person do not occur, and, also in the case of no application of an AC voltage signal, the AC voltage applied to an electrode is not zero in accordance with an influence of the other groups, whereby it is assumed that an unnecessary tactile sense is not presented in an area other than the target area.

FIG. 16 is an explanatory diagram that illustrates the waveform of surface electric potential of the target area 132c observed in a case where the drive method according to the first embodiment is used. In the drawing, the horizontal axis represents the time, and the vertical axis represents the surface electric potential. In FIG. 16, surface electric potential observed during a period in which a presented content of a tactile sense transits from the N-th frame to the (N+1)-th frame is illustrated. In the N-th frame and the (N+1)-th frame, an electric beat having a maximum amplitude A due to the first AC voltage signal and the second AC voltage signal is observed. In addition, during the transition period, an electric beat having a maximum amplitude A' smaller than the maximum amplitude A is generated. The inventors of the present application have checked by experiments that a difference between the amplitudes A and A' is a difference that cannot be perceived as a difference in the tactile sense, and thus, a texture sense can be continuously perceived also during the transition period. It is assumed that, since the area influenced by the floating inside the target area becomes ¼, also during the transition period, an electric beat is present while being slightly attenuated, and accordingly, a texture sense is continuously present. In addition, the electrode that is in the floating state is capacitive-coupled with the neighboring electrodes of the other groups to which an AC voltage signal is applied, and the voltage thereof is not zero. For this reason, it is assumed that, also in the electrode that is in the floating state, the electric beat is not completely zero but a texture sense is continuously present. In this way, the tactile sense presentation device 100 according to this embodiment can continuously present a texture sense without being interrupted in the target area also in a case where the target area is moved. Since the texture sense is not interrupted when the target area is moved, a user does not feel a sense of incongruity. In other words, an unnecessary tactile sense of interrupting a texture sense is not presented in the target area.

Second Embodiment

Figure 17:
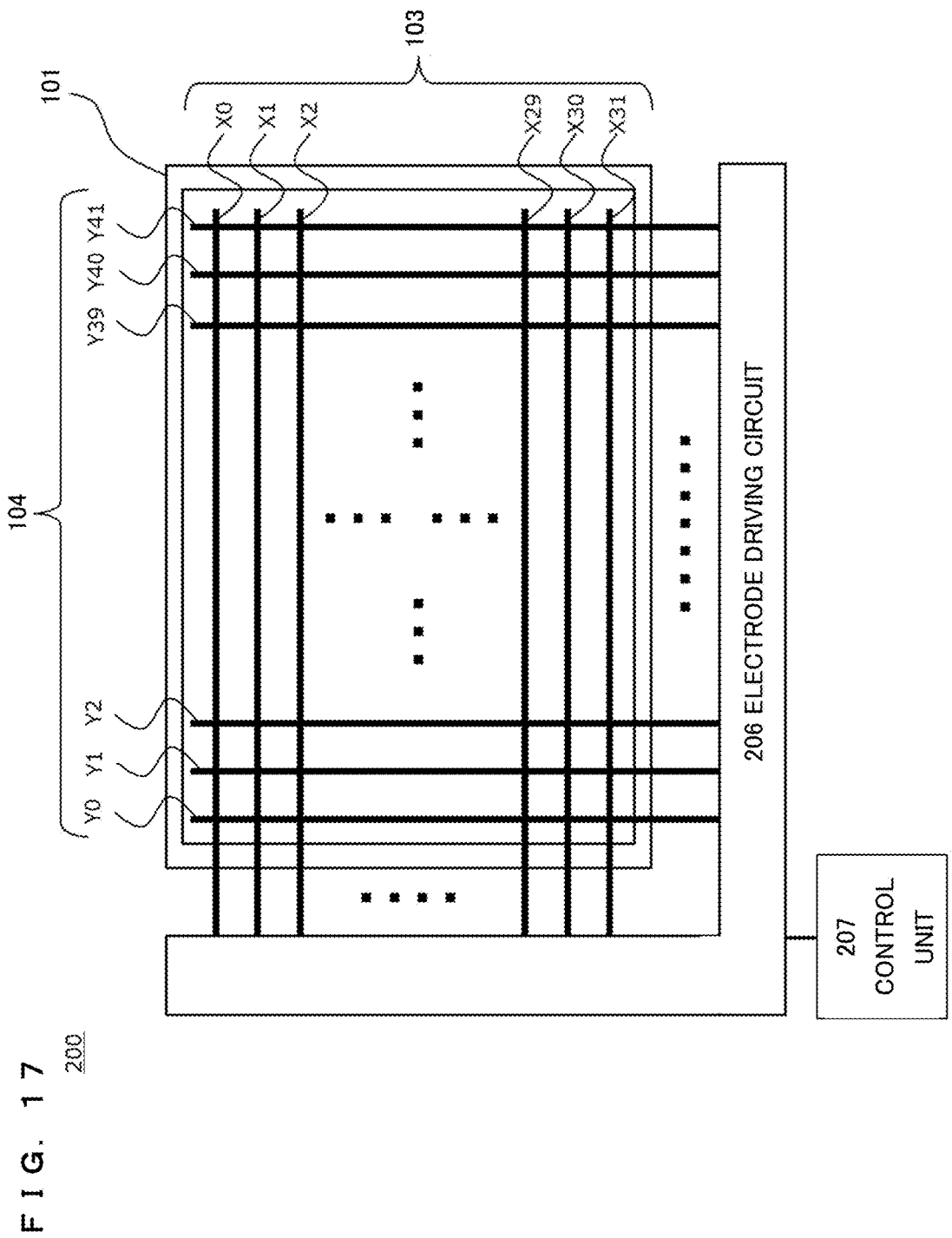
FIG. 17 is an explanatory diagram that illustrates the configuration of a tactile sense presentation device according to a second embodiment.
Figure 18:
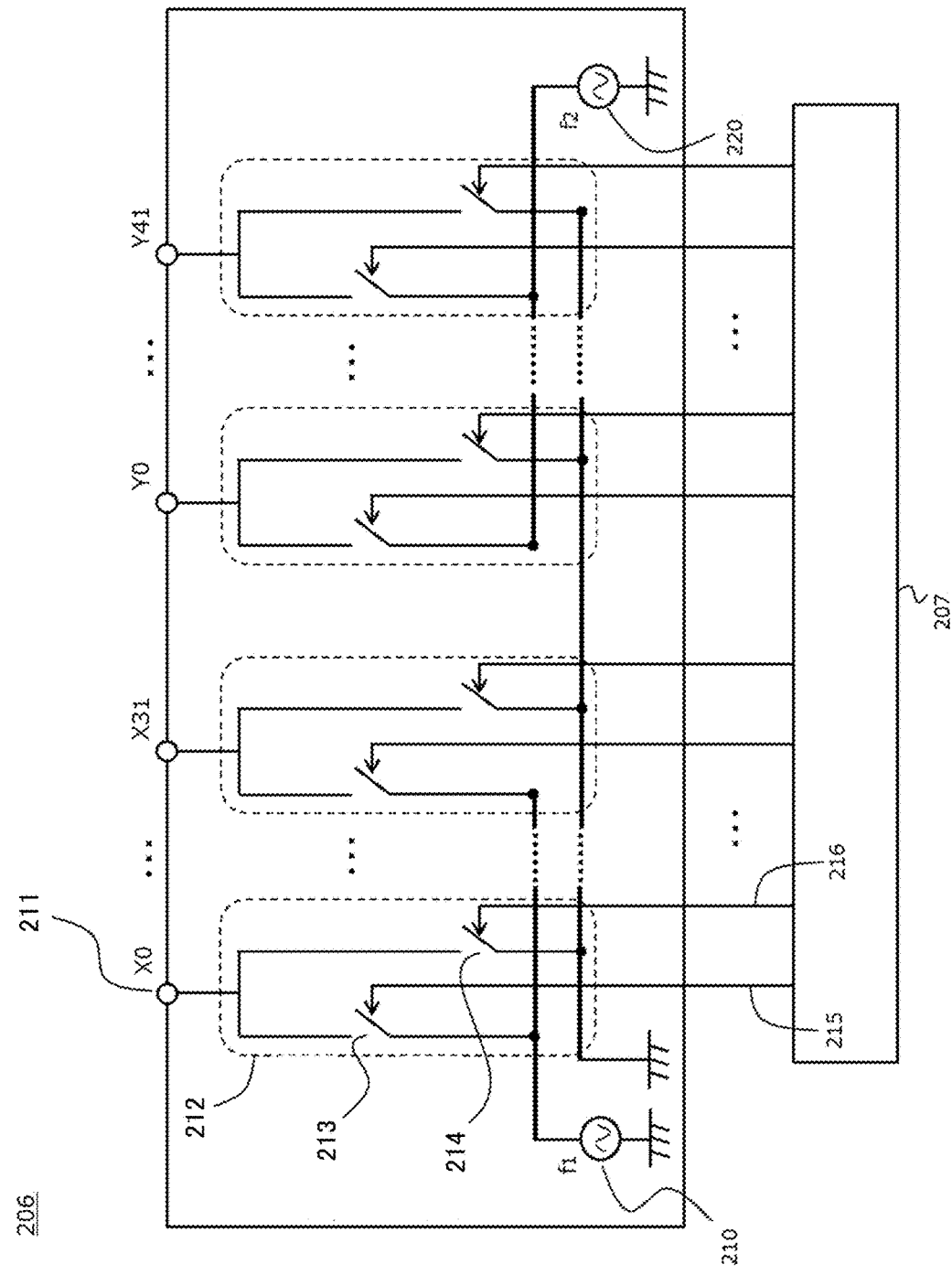
FIG. 18 is an explanatory diagram that illustrates the configuration of an electrode driving circuit illustrated in FIG. 17.

A tactile sense presentation device according to a second embodiment will be described. FIG. 17 is an explanatory diagram that illustrates the configuration of the tactile sense presentation device 200 according to the second embodiment. In the second embodiment, a same electrode driving circuit 206 is connected to X electrodes 103 and Y electrodes 104. A control unit 207 is connected to the electrode driving circuit 206. FIG. 18 is an explanatory diagram that illustrates the configuration of the electrode driving circuit 206 illustrated in FIG. 17. The electrode driving circuit 206 includes: a first AC voltage signal source 210; and a second AC voltage signal source 220. In addition, similar to the X electrode driving circuit and the Y electrode driving circuit according to the first embodiment, an output terminal 211, a switching circuit 212, and switching devices 213 and 214 are arranged. Furthermore, similarly, each of X electrodes 103 (X0, X1, . . . , X31) is configured to be connectable to a first AC voltage signal source 210 or the ground. In addition, each of Y electrodes 104 (Y0, Y1, . . . , Y41) is configured to be connectable to a second AC voltage signal source 220 or the ground. The other configurations of the tactile sense presentation device 200 are similar to those of the first embodiment.

As described above, in the second embodiment, the X electrode driving circuit 105 and the Y electrode driving circuit 106 according to the first embodiment illustrated in FIG. 3 are integrated into one circuit and are replaced by the electrode driving circuit 206 illustrated in FIG. 17. In the tactile sense presentation device 200 according to the second embodiment, by performing an operation similar to that according to the first embodiment, effects similar to those of the first embodiment are acquired. Thus, the operations and the effects according to the second embodiment will not be described.

Third Embodiment

Figure 19:
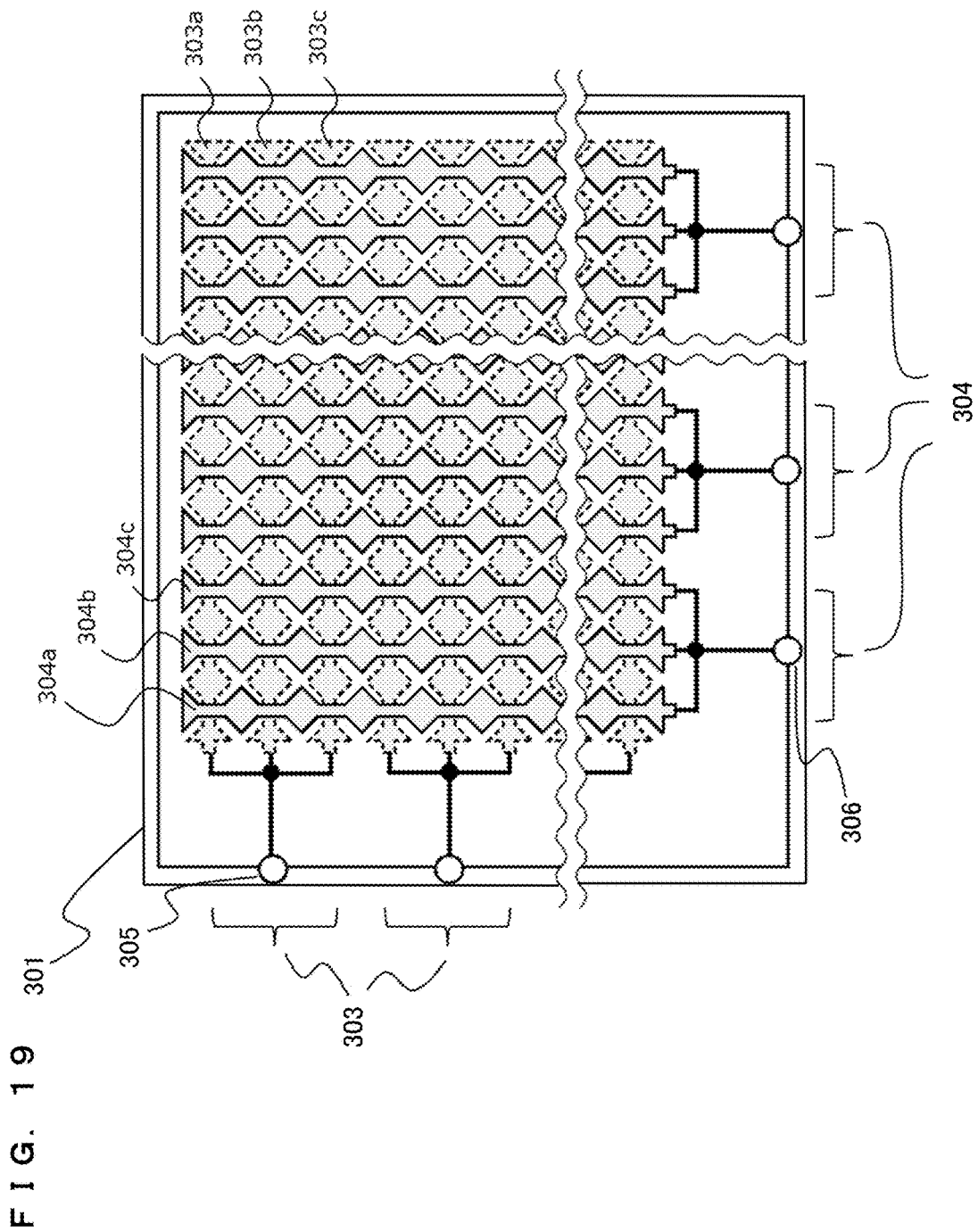
FIG. 19 is an explanatory diagram that illustrates the configuration of X electrodes and Y electrodes according to a third embodiment.

A tactile sense presentation device according to a third embodiment will be described. FIG. 19 is an explanatory diagram that illustrates the configuration of X electrodes 303 and Y electrodes 304 according to the third embodiment. As illustrated in FIG. 19, on a support substrate 301, a plurality of X electrodes 303 and a plurality of Y electrodes 304 are arranged. In the third embodiment, one X electrode 303 is configured by three sub X electrodes 303a, 303b, and 303c. These three sub electrodes are commonly connected to one connection terminal 305 by using wirings. Similarly, one Y electrode 304 is configured by three sub Y electrodes 304a, 304b, and 304c, and these three sub electrodes are commonly connected to one connection terminal 306 by using wirings. However, the number of sub electrodes configuring one electrode is not limited to three but may be any number of two or more.

Each X electrode 303 is connected to the output terminal 111 illustrated in FIG. 5 or the output terminal 211 illustrated in FIG. 18 through the connection terminal 305. In addition, each Y electrode 304 is connected to the output terminal 111 illustrated in FIG. 6 or the output terminal 211 illustrated in FIG. 18 through the connection terminal 306. The other configurations of the tactile sense presentation device are similar to those of the first embodiment.

In the first and second embodiments, in a case where the size of the support substrate is increased, a pitch between the electrodes increases. According to the third embodiment, by configuring one electrode using a plurality of sub electrodes, even when the size of the support substrate 301 is increased, the pitch of the electrodes can be configured to be fine without increasing the number of output terminals arranged on the support substrate 301. In the tactile sense presentation device according to the third embodiment, by performing an operation similar to that according to the first embodiment, effects similar to those of the first embodiment are acquired. Thus, the operations and the effects according to the third embodiment will not be described.

Fourth Embodiment

Figure 20:
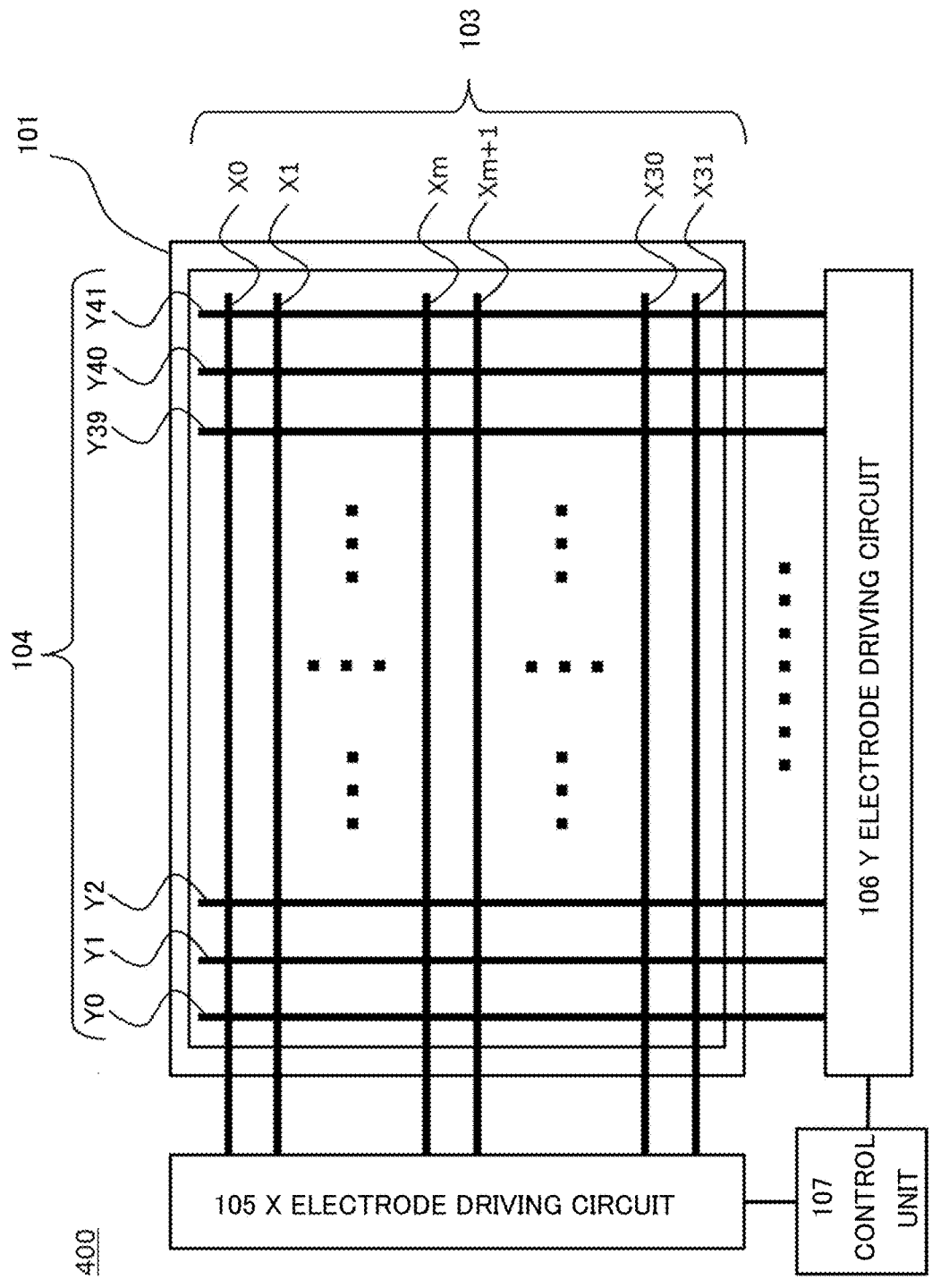
FIG. 20 is an explanatory diagram that illustrates the configuration of a tactile sense presentation device according to a fourth embodiment.

A tactile sense presentation device according to a fourth embodiment will be described. FIG. 20 is an explanatory diagram that illustrates the configuration of the tactile sense presentation device 400 according to the fourth embodiment. The configuration of the tactile sense presentation device 400 according to the fourth embodiment may be a configuration similar to that of one of the first to third embodiments. Here, the fourth embodiment will be described using a configuration similar to that of the first embodiment.

Hereinafter, in describing an example of the operation according to the fourth embodiment, two X electrodes 103 adjacent to each other represented as Xm and Xm+1 among X electrodes 103 illustrated in FIG. 20 will be focused on. Here, m is a natural number. The X electrodes Xm and Xm+1 have an adjacent relation and, thus, belong to mutually-different groups. A group to which the X electrode Xm belongs will be referred to as a group m, and a group to which the X electrode Xm+1 belongs will be referred to as a group m+1.

Figure 21:
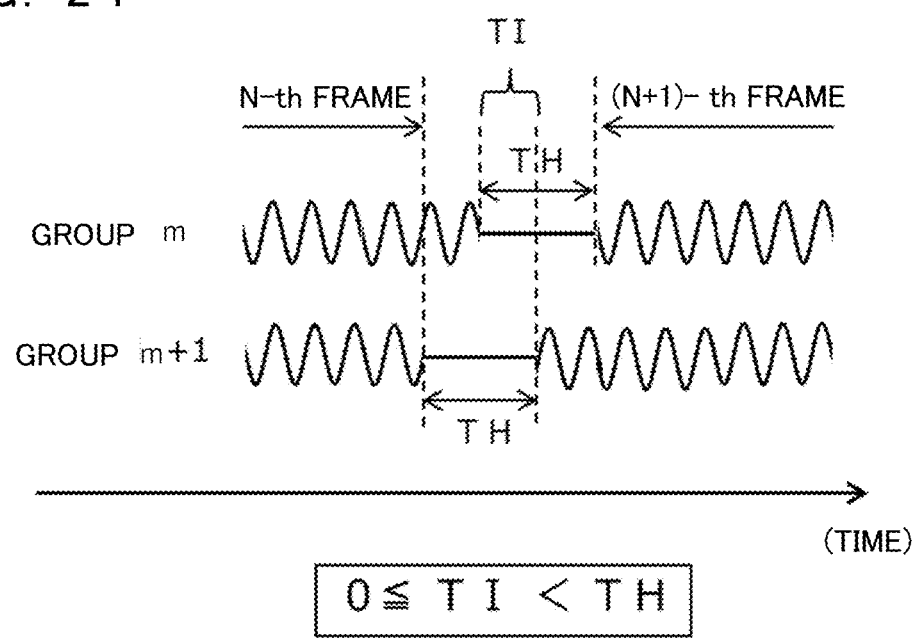
FIG. 21 is an explanatory diagram that illustrates the waveforms of voltage signals applied to an electrode belonging to a group m and an electrode belonging to a group m+1 when a presented content of a tactile sense transits from the N-th frame to the (N+1)-th frame.

FIG. 21 is an explanatory diagram that illustrates the waveforms of voltage signals applied to an electrode belonging to the group m and an electrode belonging to the group m+1 when a presented content of a tactile sense transits from the N-th frame to the (N+1)-th frame. In the drawing, the horizontal axis represents the time, and the vertical axis represents the voltage. In a period in which an electrode is in the floating state, the voltage signal is constant, and, in the other period, an AC voltage signal is applied to the electrode.

In the fourth embodiment, when the presented content of a tactile sense transits from the N-th frame to the (N+1)-th frame, times in which the electrodes are in the floating state may partly overlap each other between different groups. In other words, as illustrated in FIG. 21, times in which the electrodes are in the floating state may partly overlap each other between the group m and m+1. A time in which the electrode of each group is maintained in the floating state will be denoted by TH, and a time in which the floating states of the group m and the group m+1 overlap each other will be denoted by TI. However, there is no case where the times TH and TI are the same, in other words, there is no case where the times in which electrodes are in the floating state completely overlap each other between mutually-different groups. According to the conditions described above, the time TI may have a value satisfying the following Equation (2).

$$0 \le TI < TH \tag{2}$$

As above, while the operation of the tactile sense presentation device 400 regarding the X electrodes 103 has been described, also regarding the Y electrodes 104, the tactile sense presentation device 400 similarly operates. In the fourth embodiment, the tactile sense presentation device 400 performs an operation similar to that according to the first embodiment except that times in which the electrodes are in the floating state partly overlap each other between mutually-different groups. The effects of the present embodiment of not presenting an unnecessary tactile sense and presenting a texture sense that is not interrupted in the target area are acquired in a case where the time TI is at least slightly smaller than the time TH. In other words, in a case where periods in which floating states are formed at least deviate from each other between mutually-different groups, the effects are acquired. These effects increase as the time TI decreases and are maximum at the time of TI=0.

As above, also according to the fourth embodiment, effects similar to those of the first embodiment can be acquired. In addition, according to the fourth embodiment, the times in which the electrodes are in the floating state partly overlap each other between mutually-different groups, and accordingly, a time required for the presented content of a tactile sense to transit from the N-th frame to the (N+1)-th frame is shorter than that of the first embodiment. Since the frame transition of the presented content of a tactile sense is performed in a short time, the target area can be moved more smoothly.

Fifth Embodiment

Figure 22:
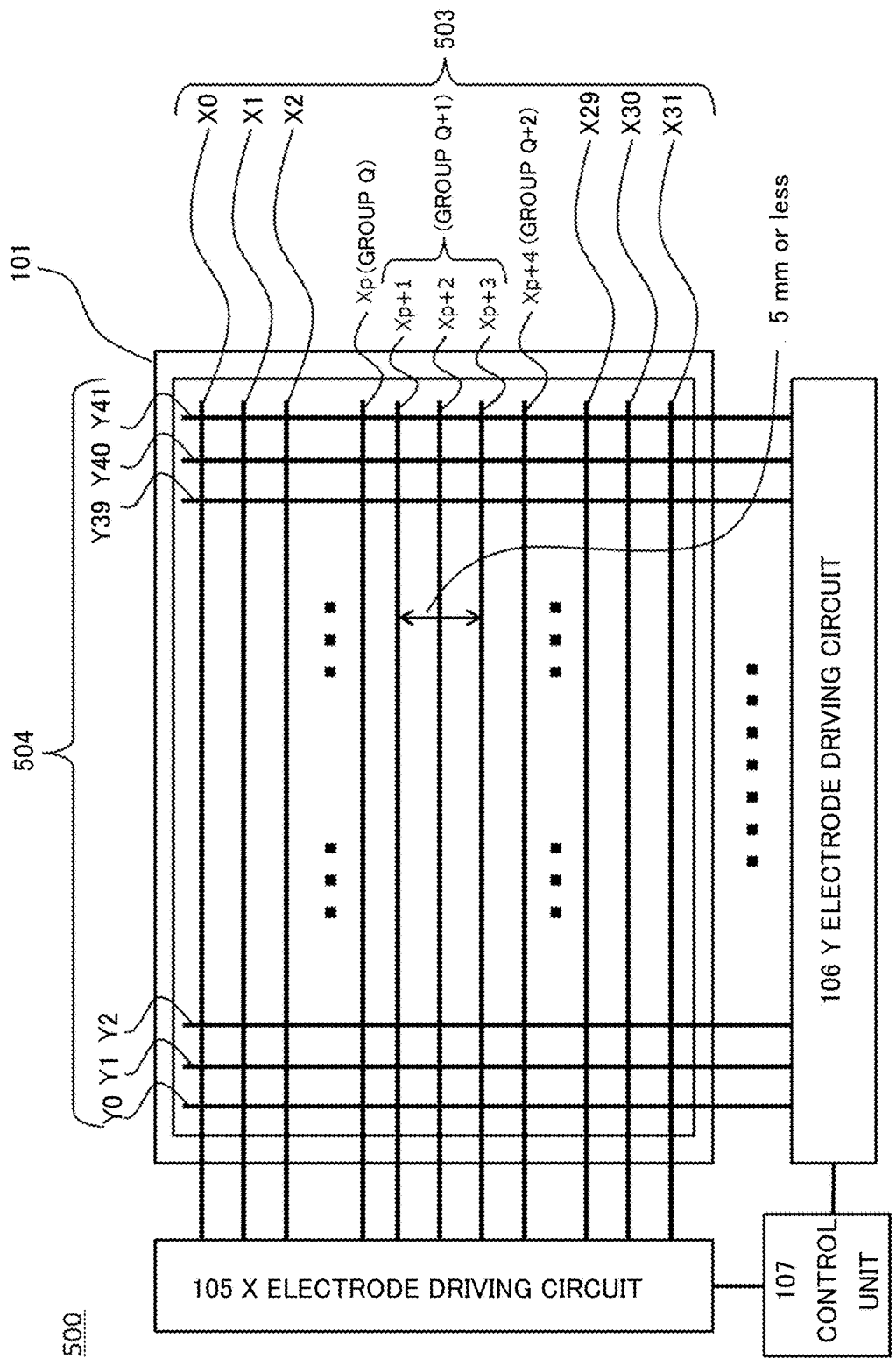
FIG. 22 is an explanatory diagram that illustrates the configuration of a tactile sense presentation device according to a fifth embodiment.

A tactile sense presentation device according to a fifth embodiment will be described. FIG. 22 is an explanatory diagram that illustrates the configuration of a tactile sense presentation device 500 according to a fifth embodiment. While the configuration of the fifth embodiment is similar to the configuration of the first embodiment, X electrodes 503 and Y electrodes 504 are arranged at a relatively fine pitch. In the example illustrated in FIG. 22, an X electrode Xp belongs to a group Q, three electrodes Xp+1 to Xp+3 continuously adjacent to each other belong to a group Q+1, and an X electrode Xp+4 belongs to a group Q+2. Here, p and Q are natural numbers. A distance between the X electrodes Xp+1 to Xp+3 belonging to the group Q+1 is 5 mm or less.

Figure 23:
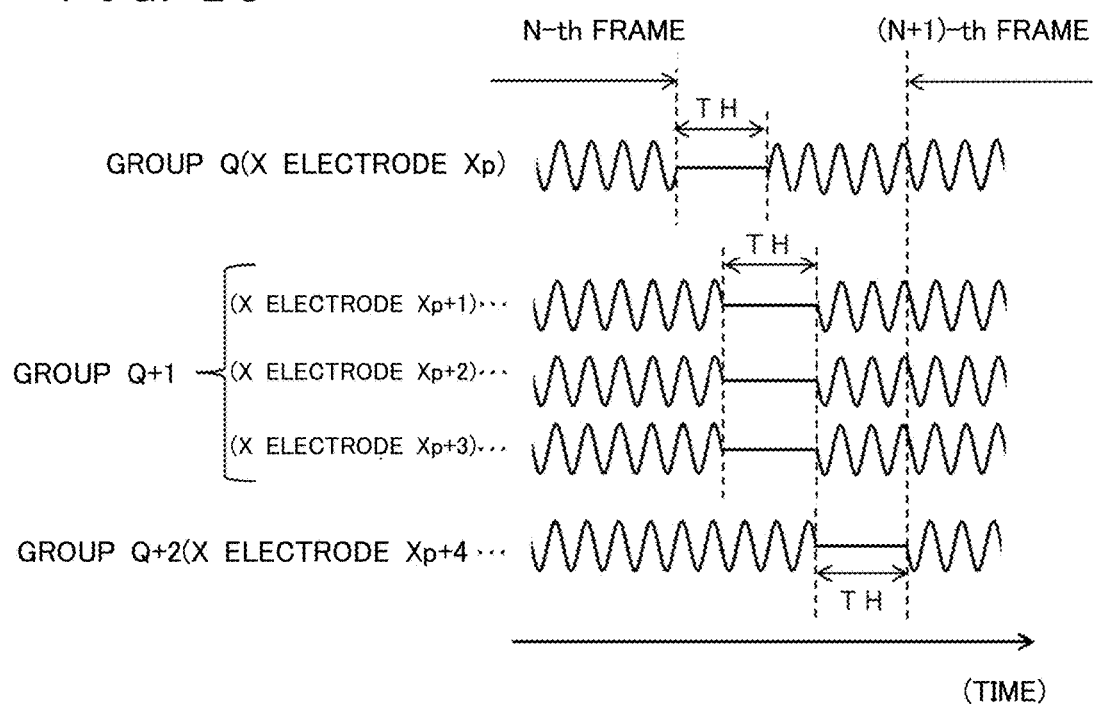
FIG. 23 is an explanatory diagram that illustrates the waveforms of voltage signals applied to X electrodes when a presented content of a tactile sense transits from the N-th frame to the (N+1)-th frame.

FIG. 23 is an explanatory diagram that illustrates the waveforms of voltage signals applied to X electrodes Xp to Xp+4 when a presented content of a tactile sense transits from the N-th frame to the (N+1)-th frame. In a period in which an electrode is in the floating state, the voltage signal is constant, and, in the other period, an AC voltage signal is applied to the electrode. The timing at which the floating state is formed is different between mutually-different groups. The X electrodes Xp+1 to Xp+3, which are continuously adjacent to each other, belonging to the same group are in the floating state at the same timing. In addition, between mutually-different groups, the times TH in which the floating state is maintained either may partly overlap each other or may not overlap each other. In the example illustrated in FIG. 23, between the group Q and the group Q+1, the times TH partly overlap each other. However, between the group Q+1 and the group Q+2, the times TH do not overlap each other. Also for the Y electrodes 504, the tactile sense presentation device 500 is similarly configured and operates in a similar manner. The other configurations and operations of the tactile sense presentation device 500 are similar to those according to the first embodiment.

As above, in the fifth embodiment, the distance between electrodes to which are arranged adjacent is sufficiently fine, and the electrodes adjacent to each other are continuously caused to belong to the same group. When the target area is moved, the electrodes belonging to the same group are in the floating state at the same timing. However, in a case where electrodes that are continuously adjacent to each other belong to the same group, like the X electrodes Xp+1 to Xp+3 illustrated in FIG. 22, it is preferable that a distance between the first electrode and the last electrode included in the electrodes that are continuously adjacent to each other is 5 mm or less.

The effect of decreasing an unnecessary tactile sense in the present embodiment is acquired by decreasing an area simultaneously receiving the influence of the electrodes being in the floating state on the surface of the tactile sense presentation device 500. In a case where a person's finger is in touch with the surface of the tactile sense presentation device 500, when an area corresponding to electrodes belonging to a plurality of groups having mutually different timings at which the floating state is formed is included in a contact area, electrodes corresponding to the whole contact area are not simultaneously in the floating state, and an effect of decreasing an unnecessary tactile sense is acquired. In a case where the contact area of the person's finger is assumed to be a circle having a diameter of 10 mm, in order to allow the area corresponding to the electrodes belonging to the plurality of groups to be included in the contact area, it is preferable that the range of the electrodes included in the same group is 5 mm or less. Accordingly, it is preferable that a distance between the first electrode and the last electrode included in the electrodes, which are continuously adjacent to each other, belonging to the same group is 5 mm or less.

As above, also in the fifth embodiment, effects similar to those of the first embodiment are acquired. In addition, in the fifth embodiment, since the X electrodes 503 and the Y electrodes 504 are arranged at a relatively fine pitch, the tactile sense presentation device 500 can present a tactile sense having high resolution.

In the first to fifth embodiments, while an example in which the tactile sense presentation device is combined with the visual display has been described, the tactile sense presentation device may not be configured not to be combined with a visual display. For example, the tactile sense presentation device may be a tablet device that presents a tactile sense without displaying an image.

The tactile sense presentation device according to the present disclosure has advantages of being capable of presenting a local tactile sense when a target area presenting a texture sense is moved like a moving image and being capable of continuously presenting a texture sense in the target area without interrupting the texture sense. Accordingly, the present disclosure effectively functions for a device that includes a visual display such as a liquid crystal display and presents a content in which an object is moved like a moving image such as, particularly, a smartphone, a tablet terminal, an amusement device, a car navigation device, and the like. In addition, the tactile sense presentation device can be used without being combined with a visual display.

In the tactile sense presentation device according to the present disclosure, an unnecessary tactile sense is not presented when a target area in which a tactile sense is presented is moved. In addition, a tactile sense presentation device capable of continuously presenting a texture sense in the target area without interrupting the texture sense can be provided.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A tactile sense presentation device, comprising:
a support substrate;
a plurality of X electrodes that are arranged on the support substrate;
a plurality of Y electrodes that are arranged on the support substrate and are insulated from the X electrodes;
a switching circuit that connects each of the X electrodes and each of the Y electrodes to an AC voltage signal source or a reference voltage source; and
a control unit that is used for controlling the switching circuit,
wherein the X electrodes are divided into a plurality of groups,
the Y electrodes are divided into the plurality of groups, and
the control unit at different timings for each of the groups, changes states of the X electrodes and the Y electrodes from a state of being connected to the AC voltage signal source or the reference voltage source to a state of floating, or from the state of floating to the state of being connected to the AC voltage signal source or the reference voltage source.

2. The tactile sense presentation device according to claim 1, further comprising:
an electrode driving circuit that includes the AC voltage signal source, the reference voltage source, and the switching circuit,
wherein the control unit provides the electrode driving circuit with instruction specifying a target area included in an area where the plurality of X electrodes and Y electrodes are corresponding in correspondence with information input from the outside,
the electrode driving circuit applies a voltage signal having a first frequency to the X electrodes corresponding to the target area,
the electrode driving circuit applies a voltage signal having a second frequency to the Y electrodes corresponding to the target area, and
the electrode driving circuit generates an electric beat vibration in the target area based on an absolute value of a difference between the first and second frequencies and presents a texture sense using an electrostatic force caused by the electric beat vibration.

3. The tactile sense presentation device according to claim 2, wherein the electrode driving circuit does not present an unnecessary tactile sense in an area other than the target area.

4. The tactile sense presentation device according to claim 3,
wherein the electrode driving circuit connects the X electrodes and the Y electrodes not corresponding to the target area to the reference voltage source, and
the electrode driving circuit changes the states of the X electrodes and the Y electrodes corresponding to the target area at different timings for each of the groups.

5. The tactile sense presentation device according to claim 2,
wherein the electrode driving circuit does not present an unnecessary tactile sense for the target area.

6. The tactile sense presentation device according to claim 5,
wherein the electrode driving circuit changes timing at which connections of the X electrodes and the Y electrodes corresponding to the target area to the AC voltage signal source are open for each of the groups.

7. The tactile sense presentation device according to claim 1,
wherein the X electrodes adjacent to each other and the Y electrodes adjacent to each other belong to mutually-different groups.

8. A method of driving a tactile sense presentation device including:
a support substrate;
a plurality of X electrodes that are arranged on the support substrate;
a plurality of Y electrodes that are arranged on the support substrate and are insulated from the X electrodes;
a switching circuit that connects each of the X electrodes and each of the Y electrodes to an AC voltage signal source or a reference voltage source selectively; and
a control unit that is used for controlling the switching circuit, the method comprising:
dividing the X electrodes into a plurality of groups;
dividing the Y electrodes into the plurality of groups; and
changing states of the X electrodes and the Y electrodes, at different timings for each of the groups, from a state of being connected to the AC voltage signal source or the reference voltage source to a state of floating, or from the state of floating to the state of being connected to the AC voltage signal source or the reference voltage source.

9. The method according to claim 8, further comprising changing the states of each of the X electrodes and each of the Y electrodes to one of a state of being connected to the AC voltage signal source or the reference voltage source and a state of floating.

10. The method according to claim 9, further comprising changing the states of each of the X electrodes and each of the Y electrodes from the state of being connected to the AC voltage signal source or the reference voltage source to the state of floating, and thereafter from the state of floating to the state of being connected to the AC voltage signal source or the reference voltage source.

11. The method according to claim 8, further comprising dividing the X electrodes and the Y electrodes such that the X electrodes adjacent to each other and the Y electrodes adjacent to each other belong to mutually-different groups.

12. A tactile sense presentation device, comprising:
a support substrate;
a plurality of X electrodes that are arranged on the support substrate;
a plurality of Y electrodes that are arranged on the support substrate and are insulated from the X electrodes;
a switching circuit that turns on/off an electric connection between each of the X electrodes and the Y electrodes and an AC voltage signal source and turns on/off an electric connection between each of the X electrodes and the Y electrodes and a reference voltage source; and
a control unit that is used for controlling the switching circuit,
wherein each of the X electrodes and the Y electrodes takes one of a first state of being connected to one of the AC voltage signal source and the reference voltage source and a second state of not being connected to both of the AC voltage signal source and the reference voltage source, and
the control unit controls the switching circuit such that, between at least some electrodes adjacent to each other among the X electrodes and the Y electrodes, periods of the second state partly overlap each other or do not overlap each other.

13. A tactile sense presentation device according to claim 12,
wherein between at least some electrodes adjacent to each other among the X electrodes and the Y electrodes, when a length of a period in which periods of the second state overlap each other is TI, and a length of a period of the second state is TH, "$0 \leq TI < TH$" is satisfied.

* * * * *